(12) United States Patent
Kaiser et al.

(10) Patent No.: US 11,347,721 B2
(45) Date of Patent: May 31, 2022

(54) DIGITAL PROCESSING SYSTEMS AND METHODS FOR AUTOMATIC APPLICATION OF SUB-BOARD TEMPLATES IN COLLABORATIVE WORK SYSTEMS

(71) Applicant: MONDAY.COM LTD., Tel Aviv (IL)

(72) Inventors: Oron Kaiser, Giv'atayim (IL); Oron Morad, Or Yehuda (IL); Dor Yehuda, Ramat Gan (IL); Daniel Lereya, Tel Aviv (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/243,809

(22) Filed: Apr. 29, 2021

(65) Prior Publication Data

US 2021/0390088 A1 Dec. 16, 2021

Related U.S. Application Data

(63) Continuation of application No. PCT/IB2021/000297, filed on Apr. 28, 2021, and a
(Continued)

(51) Int. Cl.
G06F 16/23 (2019.01)
G06F 16/22 (2019.01)

(52) U.S. Cl.
CPC ...... *G06F 16/2365* (2019.01); *G06F 16/2282* (2019.01)

(58) Field of Classification Search
CPC ............ G06F 16/2365; G06F 16/2282; G06F 16/211; Y10S 707/99943
See application file for complete search history.

(56) References Cited

U.S. PATENT DOCUMENTS 5,479,602 A 12/1995 Baecker et al.
5,696,702 A 12/1997 Skinner et al.
(Continued)

FOREIGN PATENT DOCUMENTS

CN 107422666 A 12/2017
CN 107623596 A 1/2018
(Continued)

OTHER PUBLICATIONS

U.S. Appl. No. 17/143,897, filed Jan. 7, 2021.
(Continued)

*Primary Examiner* — Robert W Beausoliel, Jr.
*Assistant Examiner* — Mohammad Solaiman Bhuyan
(74) *Attorney, Agent, or Firm* — Finnegan, Henderson, Farabow, Garrett & Dunner, LLP

(57) ABSTRACT

Systems, methods, and computer-readable media for representing data via a multi-structured table are disclosed. The systems and methods may involve maintaining a main table having a first structure and containing a plurality of rows; receiving a first electronic request for establishment of a first sub-table associated with the main table, wherein the electronic request includes column heading definitions and wherein the column heading definitions constitute a second structure; storing the second structure in memory as a default sub-table structure; associating the first sub-table with a first row in the main table; receiving a second electronic request for association of a second sub-table with a second row of the main table; performing a lookup of the default sub-table structure following receipt of the second electronic request; applying the default sub-table structure to the second sub-table.

20 Claims, 27 Drawing Sheets

Related U.S. Application Data continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(56) References Cited

U.S. PATENT DOCUMENTS

| | | |
|---|---|---|
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,798,829 B1 | 10/2017 | Baisley |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,445,702 B1 | 10/2019 | Hunt |
| 10,452,360 B1 | 10/2019 | Burman et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,628,002 B1 | 4/2020 | Kang et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |

(56) References Cited

U.S. PATENT DOCUMENTS

| | | |
|---|---|---|
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0039001 A1 | 2/2005 | Hudis et al. |
| 2005/0044486 A1 | 2/2005 | Kotler et al. |
| 2005/0086360 A1 | 4/2005 | Mamou et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2007/0050322 A1 | 3/2007 | Vigesaa et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1* | 5/2008 | Chin ................... G06F 40/177 |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1* | 12/2009 | Meehan ................ G06F 16/248 |
| 2009/0327851 A1 | 12/2009 | Raposo |
| 2010/0017699 A1 | 1/2010 | Farrell et al. |
| 2010/0070895 A1 | 3/2010 | Messer |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0089914 A1 | 4/2012 | Holt et al. |
| 2012/0096389 A1* | 4/2012 | Flam ..................... G06F 16/168 |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |

(56) References Cited

U.S. PATENT DOCUMENTS

| | | |
|---|---|---|
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1* | 6/2012 | Tseng .................. G06F 16/27 707/748 |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1* | 10/2012 | Jin .................. G06F 16/221 707/797 |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0109012 A1 | 4/2014 | Choudhary et al. |
| 2014/0115518 A1 | 4/2014 | Abdukalykov et al. |
| 2014/0136972 A1 | 5/2014 | Rodgers et al. |
| 2014/0137144 A1 | 5/2014 | Järvenpää et al. |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0125834 A1 | 5/2015 | Mendoza |
| 2015/0153943 A1 | 6/2015 | Wang |
| 2015/0169531 A1 | 6/2015 | Campbell et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124772 A1 | 5/2017 | Campbell et al. |
| 2017/0139884 A1 | 5/2017 | Bendig et al. |
| 2017/0153771 A1 | 6/2017 | Chu |
| 2017/0185668 A1 | 6/2017 | Convertino et al. |
| 2017/0221072 A1 | 8/2017 | AthuluruTlrumala et al. |
| 2017/0236081 A1 | 8/2017 | Grady Smith et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0351252 A1 | 12/2017 | Kleifges et al. |
| 2017/0372442 A1 | 12/2017 | Mejias |
| 2018/0032570 A1 | 2/2018 | Miller et al. |
| 2018/0055434 A1 | 3/2018 | Cheung et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0276417 A1 | 9/2018 | Cerezo |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373757 A1 | 12/2018 | Schukovets et al. |
| 2019/0036989 A1 | 1/2019 | Eirinberg et al. |

(56) References Cited

U.S. PATENT DOCUMENTS

| | | |
|---|---|---|
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |

FOREIGN PATENT DOCUMENTS

| | | |
|---|---|---|
| CN | 107885656 A | 4/2018 |
| WO | WO 2004/100015 A2 | 11/2004 |
| WO | WO 2006/116580 A2 | 11/2006 |
| WO | WO 2017202159 A1 | 11/2017 |

OTHER PUBLICATIONS

U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,803, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
D'Alessio et al., Monday.com Walkthrough 2018\All Features, Platforms & Thoughts, (https://www.youtube.com/watch?v=ajBtOzTlhC8&t=352s), Mar. 1, 2018, Screenshots and transcript pp. 1-55, (Year: 2018).
Rodrigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, mailed May 3, 2021 (19 pages).
International Search Report in PCT/IB2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/1B2021/000024, dated May 3, 2021 (13 pages).
"Pivot table—Wikipedia"; URL: https://en.wikipedia.org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2010, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).

* cited by examiner

FIG. 8

Default values ☆                                      Last seen 👤  &Invite / 1  ⁄Activity  [+ Add to board]
Add Board description
≡ All views  |  ⊞ Main Table ⁝                           ⬡ Integrate / 0  ⊞ Automate / 3  ⊗

[New Task|∨]  ⌕Search  @Person  ▽Filter∨  ↕Sort  ⤢  ⊘  ⌑≡ ⧈

| Project | Subite... | Person | Status | Date | Dropdown | Formula |
|---------|-----------|--------|--------|------|----------|---------|
| Item 1  | ⌕ =1      | Ⓐ A    | Stuck  | 19 Dec | | Stuck |
| Item 2  | ⌕ =       | Ⓐ B    | Done   | 18 Dec | | Done |
| Item 3  | ⌕ =       | Ⓐ C    | Stuck  | 18 Dec | | Empty |
| Dor     | ⌕ =       | Ⓐ A    | Done   | 20 Dec | | Stuck |
| Kate    |           | Ⓐ D    |        | 21 Dec 15:02 | | |
| + Add   |           |        |        |        | | ⓘ N/A |

| Project 1 | | Subitems | Person | Status | Date | Timeline | Progress |
|---|---|---|---|---|---|---|---|
| Task 1 | ○ | 4 | 👤 | Stuck | Mar 4 | Mar 4 | 0% |

| Subitems | | | | | | |
|---|---|---|---|---|---|---|
| | Owner | Status | Date | Progress | | |
| Subitem Task 1-1 | 👤 | Done | Jan 14 | 100% | | |
| Subitem Task 1-2 | 👤 | Done | Feb 18 | 100% | | |
| Subitem Task 1-3 | 👤 | Stuck | Feb 26 | 0% | | |
| Subitem Task 1-4 | 👤 | Working on it | Mar 2 | 0% | | |
| + Add | | | | | | |

| Task 2 | ○ | 3 | 👤 | Done | Mar 4 | Mar 4 | 100% |

| Subitems | | | | | | |
|---|---|---|---|---|---|---|
| | Owner | Status | Date | Progress | | |
| Subitem Task 2-1 | 👤 | | | 0% | | |
| Subitem Task 2-2 | 👤 | | | 0% | | |
| Subitem Task 2-3 | 👤 | | | 0% | | |
| + Add | | | | | | |

| Task 3 | ○ | 5 | 👤 | Working on it | | Mar 4 | 0% |

*Default sub-table structure*
Structure (Board 2)
...

| Project 1 | | Subitems | Person | Status | Date | Timeline | Progress |
|---|---|---|---|---|---|---|---|
| Task 1 | 💬 | 📋4 | 👤 | Stuck | Mar 4 | ▬▬Mar 4 | ☐ 0% |

| Subitems | Owner | Status | Date | Time Tracking | Progress |
|---|---|---|---|---|---|
| Subitem Task 1-1 💬 | 👤 | Done | Jan 14 | ⊙ | ■ 100% |
| Subitem Task 1-2 💬 | 👤👤 | Done | Feb 18 | ⊙ | ■ 100% |
| Subitem Task 1-3 💬 | 👤 | Stuck | Feb 26 | ⊙ | ☐ 0% |
| Subitem Task 1-4 💬 | 👤 | Working on it | Mar 2 | ⊙ | ☐ 0% |
| + Add | | | | | |

| Task 2 | 💬 | 📋3 | 👤 | Done | Mar 4 | ▬▬Mar 4 | ■ 100% |
|---|---|---|---|---|---|---|---|

| Subitems | Owner | Status | Date | Time Tracking | Progress |
|---|---|---|---|---|---|
| Subitem Task 2-1 💬 | 👤 | | | ⊙ | ☐ 0% |
| Subitem Task 2-2 💬 | 👤 | | | ⊙ | ☐ 0% |
| Subitem Task 2-3 💬 | 👤 | | | ⊙ | ☐ 0% |
| + Add | | | | | |

| Task 3 | 💬 | 📋5 | 👤 | Working on it | Mar 4 | ▬▬ | ☐ 0% |
|---|---|---|---|---|---|---|---|

Time tracking
Number
Progress
...

DIGITAL PROCESSING SYSTEMS AND METHODS FOR AUTOMATIC APPLICATION OF SUB-BOARD TEMPLATES IN COLLABORATIVE WORK SYSTEMS

CROSS-REFERENCE TO RELATED APPLICATIONS

This application is based on and claims benefit of priority of U.S. Nonprovisional patent application Ser. No. 17/242,452, filed Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

A system for identifying data types in customized headings, the system comprising: at least one processor configured to: display a table having at least one customizable row heading or column heading; receive an insertion of a customized name for the at least one customizable row heading or column heading; perform a lookup of the inserted customized name to identify a data type associated with the inserted customized name; display, based on the identified data type, selectable options for values for an associated cell of the at least one customizable row heading or column heading; enable selection of at least one option of the selectable options; and associate the selected option with the associated cell in at least one row or column associated with the at least one customizable row heading or column heading.

A system for generating a hybrid table template pre-populated with data pulled from preexisting tables, the system comprising: at least one processor configured to: store a customized hybrid table-template definition, wherein the hybrid table-template definition includes a table format and at least one pre-population rule linking at least one cell of the hybrid table template with at least one cell of a preexisting table populated with data; receive a request to generate a new table using the hybrid table template definition; and following receipt of the request, generate the new table, wherein generating includes following a link to access real-time cell data from the preexisting table, and migrating the real-time cell data to the new table.

A system for representing data via a multi-structured table, the system comprising: at least one processor configured to: maintain a main table having a first structure and containing a plurality of rows; receive a first electronic request for establishment of a first sub-table associated with the main table, wherein the electronic request includes column heading definitions and wherein the column heading definitions constitute a second structure; store the second structure in memory as a default sub-table structure; associate the first sub-table with a first row in the main table; receive a second electronic request for association of a second sub-table with a second row of the main table; perform a lookup of the default sub-table structure following receipt of the second electronic request; apply the default sub-table structure to the second sub-table; and receive a change to a structure of the second sub-table, and upon receipt of the change, cause a corresponding change to occur in the first sub-table and the default sub-table structure.

A system for deconstructing an integrated web of structural components and data, the system comprising: at least one processor configured to: maintain the integrated web of the structural components and the data, wherein the structural components include customized tables for maintaining the data, automations for acting on the data in the customized tables, and dashboards for visualizing the data; receive instructions to alter elements of at least some of the structural components; update the integrated web to comport with the instructions; receive a command to generate a copy of the structural components of the integrated web without the data; and in response to the command, output the copy of the structural components in a template format that permits the copy to be adopted for secondary use.

BRIEF DESCRIPTION OF THE DRAWINGS

FIG. 8 illustrates an example of an interface for requesting to generate a new table using the hybrid table template definition, consistent with some embodiments of the present disclosure.

FIG. 11 illustrates an example of an interface generating the new table, consistent with some embodiments of the present disclosure.

FIG. 17 illustrates example views of updating data in the first sub-table that does not alter data in the main table, consistent with some embodiments of the present disclosure.

FIGS. 18A and 18B illustrate example views of receiving an activation of a link in the first row of the main table to access the first sub-table, consistent with some embodiments of the present disclosure.

FIG. 20 illustrates an example view of looking up and selecting the default sub-table structure to apply to the second sub-table, consistent with some embodiments of the present disclosure.

FIG. 21 illustrates an example view of receiving a change to a structure of the second sub-table to cause a corresponding change to occur in the first sub-table and the default sub-table structure, consistent with some embodiments of the present disclosure.

DETAILED DESCRIPTION

Figure 1:
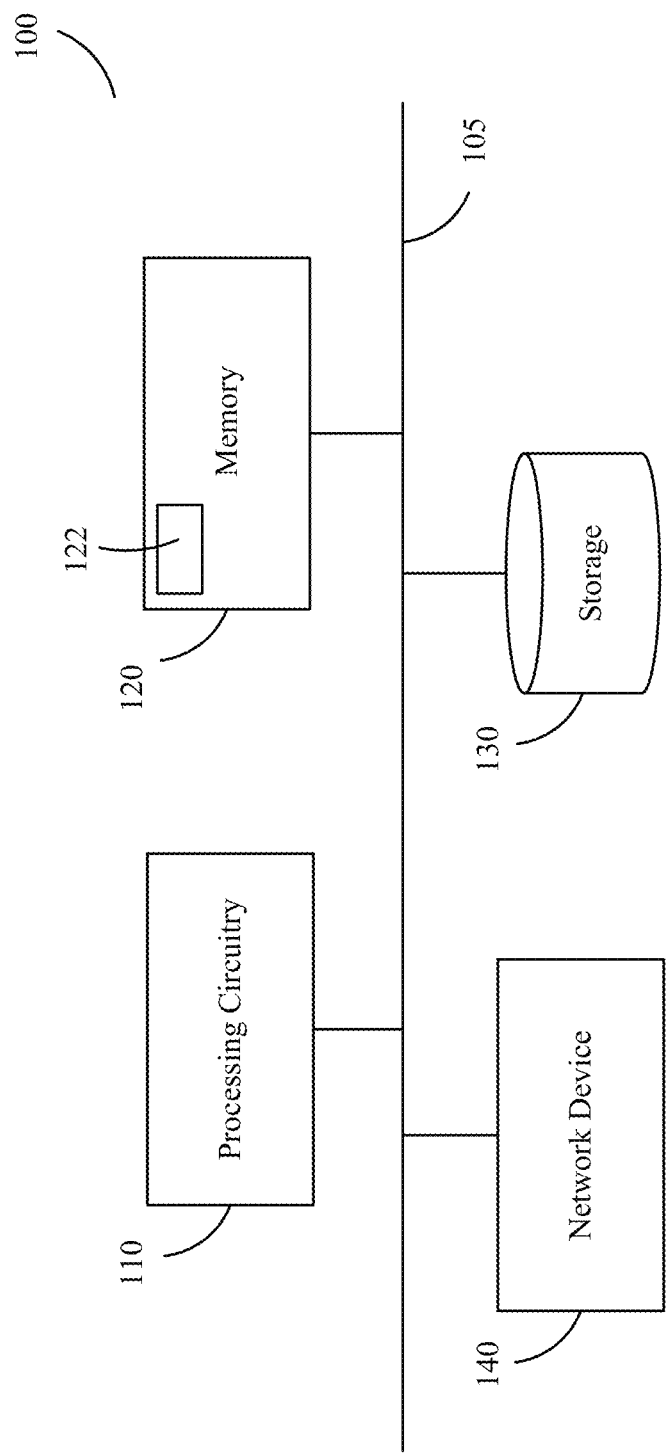
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense, the term "row" may refer to one or more of a horizontal and a vertical presentation. A table or tablature, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
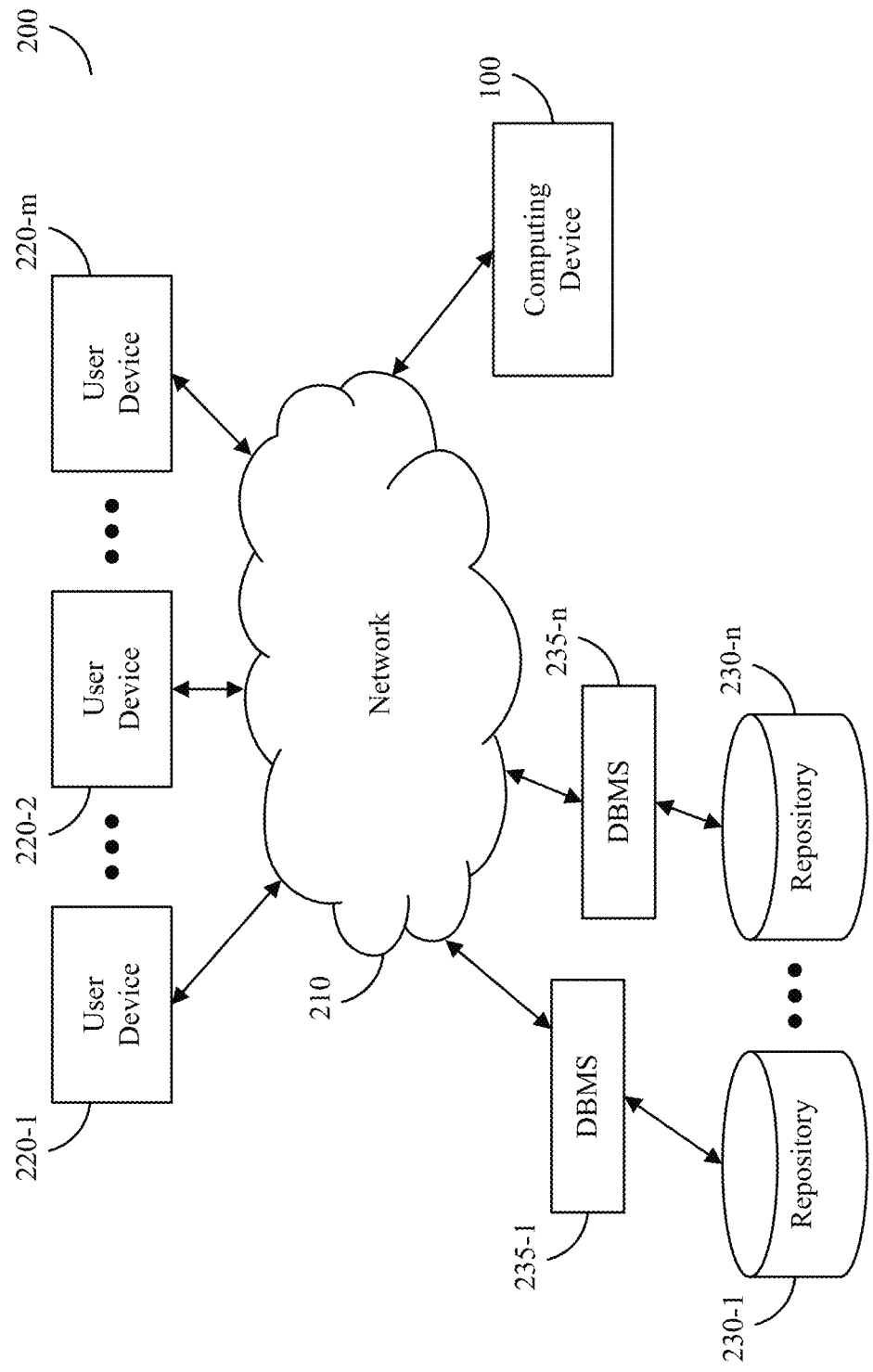
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-$n$, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-$n$. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may relate to a system for identifying data types in customized headings, including methods, systems, devices, and computer readable media. For ease of discussion, a system is described below, with the understanding that aspects of the system apply equally to non-transitory computer readable media, methods, and devices. For example, some aspects of such a system may include at least one processor configured to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

In a data management platform, it may be important for users to customize headings of rows and headings of various tables and have selectable options for values for an associated cell of the customizable heading that are specific to particular customized headings and automatically catered based on the recognized and customized heading to comply with user needs and customization of data management. Further, it may be valuable for users to create tables unique to their specifications. By customizing rows and headings of tables and being provided selectable options in response to customization, the user may experience various efficiencies to their business or personal requirements. Automatic identification of customization of multiple headings and providing selectable options for better use across multiple boards can be a difficult task. Merely using a pen and paper to track changes to hundreds of boards would result in mistakes and multiple headings being ignored and merely populating tables creates inefficiencies in workflows and data processing. The challenges addressed herein do not suit themselves to mental organizational tasks, requiring the unconventional solutions described herein.

Therefore, there is a need for unconventional approaches to enable a user to customize row headings or column headings and receive selectable options for values that are specific to the meaning of the customized headings for input into an associated cell of the customizable headings. Accordingly, by performing a lookup in the system, some disclosed embodiments create efficiencies in identifying data types based on the semantic meaning of customized headings and providing selectable options specific to each of the customized headings. Additionally, the system described below may provide suggestions that create needed efficiencies when developing management systems by recognizing historical usage and providing more accurate data inputs.

Aspects of this disclosure may include identifying data types in customized headings. A customized heading may include a non-preset value that is input for a heading. For example, a customized heading may be generated according to user preference. While the customized heading may be stored for later use, the original generation of the heading was customized. Identifying data types may include making a determination of a category of data based on characteristics of the data or from a customized heading. For example, when data may relate to money, the system may identify the data type as monetary based on an analysis that data contained in a cell contains numbers and a currency symbol. The system may also make this determination based on semantic analysis of a heading associated with a cell and recognizing that the cell is associated with a monetary data type because the heading includes key words related to money, such as text recognition of words relating to money (e.g., "USD," "Dollars," or "Euros") or recognition of symbols (e.g., $, €, ¥, or £) or a combination thereof. Other data types may include any other type of information, such as a status, calendar information, address, contact information, messages, or any other type of information that may be contained in a table.

Some embodiments may include displaying a table (e.g., which may also be referred to as a board or may be included as part of a board) having at least one customizable row heading or column heading. Displaying a table may include presenting a collection of data on a projector or display (e.g., on a touchscreen, monitor, AR/VR headset, or other display), as discussed previously. A table may be an organized collection of stored data. For example, a table may include a series of cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item). In some embodiments, the items in the table may be unifying rows or columns that represent projects, tasks, property, people, or any object, action, or group of actions that may be tracked. Additionally, the table, which may also be referred to as a board, may include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table. A display may include any interface such as a graphical user interface, a computer screen, projector, or any other electronic device for a visual presentation of data. At least one processor may be configured to present a table via a display if at least one processor outputs signals which result in a table being presented via the display.

A customizable row heading may include a label, tag, title, or any words associated with a row that is capable of being edited or input by a user of a client device or interface (e.g., through a keyboard). A customizable row heading may include any text a user may insert. By way of one example, a user may change a customizable row heading (e.g., name of an item/row) from "Item 1" to "Launch Project." Further, a user may change a customizable row heading from "Row" to "Patent Application Timeline," from "Task" to "Creative Mission," from "Customer" to "Former Client," from "Employee" to "Shareholder," from "Campaign" to "Kate's Project." In other examples, a user may change a customizable row heading that is blank and input any customized heading in place of the blank heading. In some embodiments, the row may represent something a user is managing in a board. Thus, the customizable row heading may be changed to portray exactly what the user is managing (e.g., personalizing the heading of a project, customer list, employee, or campaign). A user may be enabled to also customize activatable elements to generate additional rows, based on the customized row heading. For example, a customized activatable element such as a customized button may be associated with a customized row heading. In this way, each time the customized button is activated to insert a new row, that row follows the customization of the customized row heading. By way of one example, a system may provide an activatable element to generate or otherwise add a new row bearing the default label "New Item," such that each added row bears the "New Item" designation. However, when a user customizes the row heading to instead default to a "New Customer" label, every time the user activates the customized button, a new row may be added bearing the customized "New Customer" heading.

A customizable column heading may include a label, tag, title, or any words associated with a column that is capable of being edited or input by a user of a client device or interface (e.g., through a keyboard). A customizable column heading may include any text a user may insert. Some examples of column headings may include a people column, status column, timeline column, or any column name that may be added (either preset column from a column store or empty column). Some examples of the customizable column headings may include changing the heading of a column from "Person" to "Participants," from "Status" to "Priority," from "Date" to "Time in EST," from "Timeline" to "Revenue," from "Location" to "Project Location," or from "Status" to "Assignee." In another example, a user may change a name of a column from "Status" to "Project Deadline." In some embodiments, a user may customize a header, board name, column name, or row name, or cell name. In other examples, a user may change a customizable row heading that is blank and input any customized heading in place of the blank heading.

Figure 3:
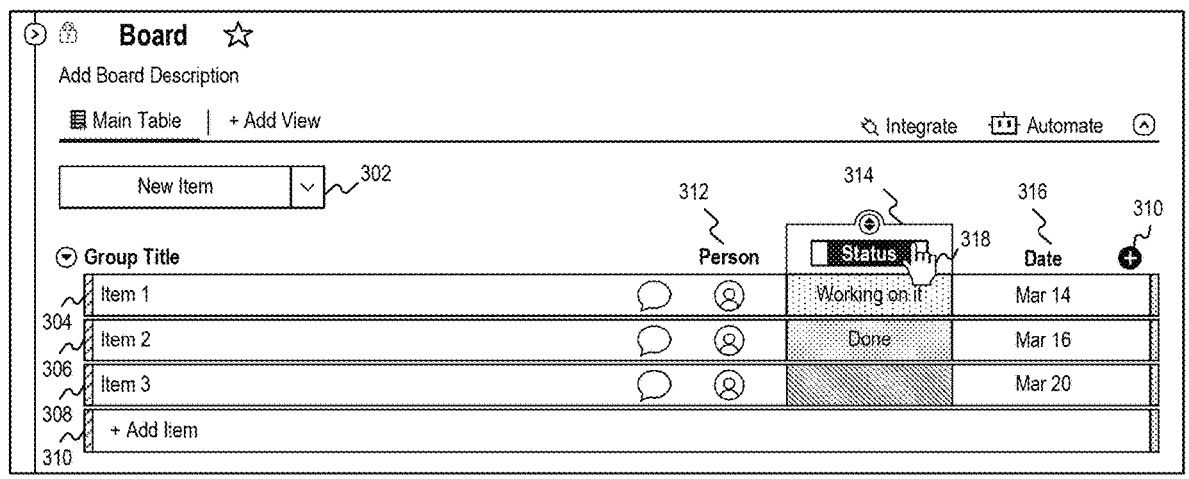
FIG. 3 illustrates a first example of an interface, consistent with some embodiments of the present disclosure.

By way of one example illustrated in FIG. 3, board 300 includes an interface displaying customizable column headings and row headings and enabling a user to customize the column headings or row headings. FIG. 3 illustrates a table having at least one customizable row heading or column heading. Specifically, board 300 includes item 304, item 306, item 308, and "add item" button 310 to add new rows or items to board 300 ("new item" button 302 may have the same functionality as "add item" button 310). In some embodiments, item 304, item 306, item 308 may have customizable row headings enabling a user to customize the heading or title of the row. For example, a user may change the title of item 304 from "Item 1" to "Marketing Initiative Spring 2020." Additionally, a user may change the title of item 306 from "Item 2" to "Marketing Initiative Fall 2020." Further, a user may change the title of item 308 from "Item 3" to "Marketing Initiative Spring 2021."

FIG. 3 illustrates displaying a table having at least one customizable row heading or column heading where users may edit text fields to any desired text. Specifically, board 300 includes column 312, column 314, column 316, and "add column" button 318 to add new columns to board 300. In some embodiments, column 312, column 314, and column 316 may have customizable column headings enabling a user to customize the title or heading of the column. For example, a user may change the title of column 312 from "Person" to "Requester." Additionally, a user may change the title of column 314 from "Status" to "Channel." Further, a user may change the title of column 316 from "Date" to "Deadline." As shown in FIG. 3, a user may click on column 314 with pointer 318 and change the title of column 314 from "Status" to any desired text.

Figure 4:
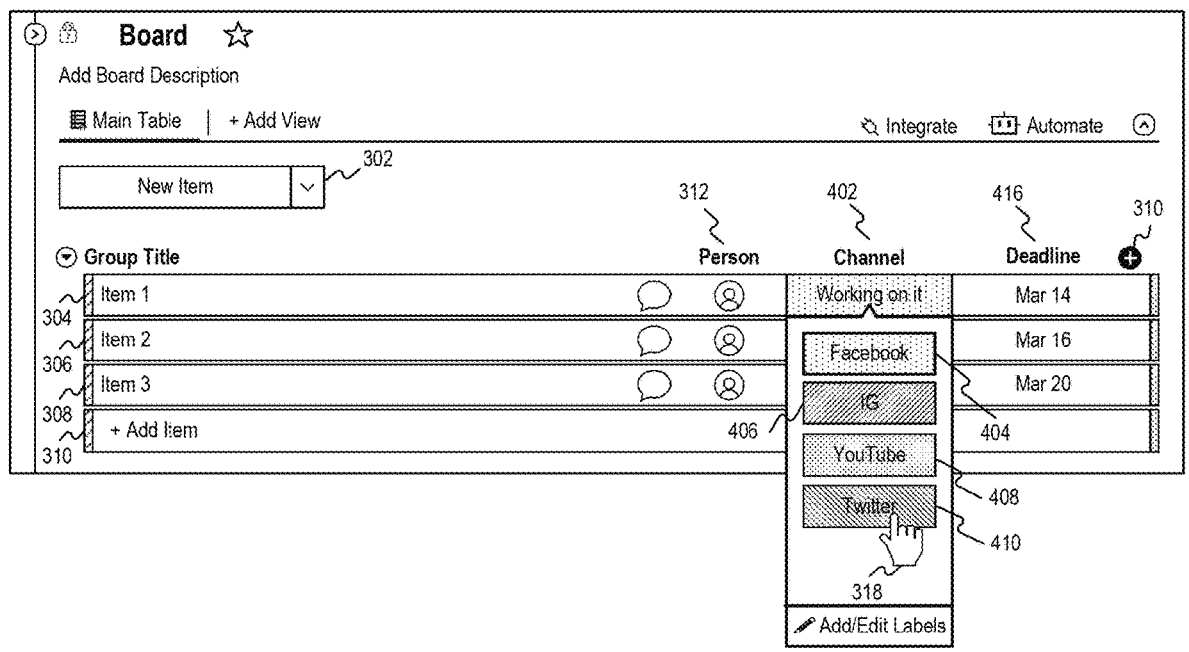
FIG. 4 illustrates a second example of a customizable interface, consistent with some embodiments of the present disclosure.

FIG. 4 illustrates a second example of an interface displaying selectable options for values for an associated cell of the customized column heading of FIG. 3, consistent with some embodiments of the present disclosure.

Aspects of this disclosure may include receiving an insertion of a customized name for the at least one customizable row heading or column heading. An insertion of a customized name may include any addition or introduction of data (e.g., alphanumeric, graphical, or combination thereof), a deletion of data, or rearrangement of data. The system may receive the insertion of a customized name manually from a user through an interface, or the insertion may be received automatically in response to a change in data in the system. By way of one example, the system may receive an input from a user changing a row heading or column heading to a customized name. The system may recognize the customized text in the column heading or row heading and store it in a database. Where the customized heading is mirrored in other boards, the mirrored customized headings may automatically change in response to a change in any instance of the customized heading in a board. Aspects of this disclosure may include receiving the insertion of the customized name using alphanumeric keystrokes. Alphanumeric keystrokes may include a depression of a key on an alphanumeric keyboard or selections made on a digital alphanumeric keyboard or touchscreen. The alphanumeric keystrokes are not limited to any language (e.g., English, Chinese, Japanese, French, Hebrew) or limited to individual keystrokes (e.g., gestures indicating entire words, rather than individual letters). By way of one example, the user may type the customized name using a physical keyboard or through a digital keyboard on a touchscreen.

As illustrated in FIG. 3, a user may insert a customized name or title for column 312 changing "Person" to "Requester" or insert a customized name for column 314 changing "Status" to "Channel," as shown in FIG. 4.

Some embodiments may include receiving an insertion of a customized name from a list of predefined customized names. A list of predefined customized names may include catalog or directory of customized names. By way of one example, instead of typing a new customized name, the system may provide a pop up with various names (e.g., previously inserted, customized names) for insertion as suggestions (sometimes because the user typed it in another cell in another column as a customized name). For example, if the user changed "Due Date" to "Project Due Date" in one column, the system may suggest changing "Item 1" to "Project" or changing "Status" to "Project Status" as a result of recognizing that the user is likely working on a "Project." Or, if the user changed "Due Date" to "Project Due Date" in one column in a first board, the system may suggest changing "Due Date" to "Project Due Date" in one column in a second board.

Aspects of some embodiments of this disclosure may include performing a lookup of an inserted customized name to identify a data type associated with the inserted customized name. Performing a lookup may include any indexing, processing, or operation to search in a data structure or data in a repository. In some embodiments, the lookup may be done via a preset repository or via a database with dynamic data. Access to the lookup may be restricted and the system may transmit a "yes" or "no" indication (or any other indication) to indicate whether the system is given authorization to perform a lookup of specific information. In this way, the system does not necessarily receive information about the customized name according to authorization settings. In some embodiments, the system may store a close list of keywords that is concerned with various areas of industry. For example, a repository may store fifty common words within the marketing industry to determine if an inserted customized name relates to marketing. The repository may store words in clusters or categories related to Customer Relationship Management (CRM), Research and Development (R&D), Information Technology (IT), Project Management Office (PMO), Legal, Human Resources (HR), and other fields. The stored words may change based on backend code checking for common names relating to an industry.

A data type may include pre-defined kinds of data associated with a column or row, as discussed previously above. For example, a data type may be a column type. Some column types include "People," "Status," "Timeline," and "Due Date." By way of one example, if a user inserts "Launch Date" in place of "Item 1," the system may recognize the customized text in the column heading and perform a lookup to determine a data type associated with the inserted customized name. The system may identify that the inserted customized name (Launch Date) relates to a "Date" data type. In response to the identification of the data type, the system may provide particular suggestions related to the data type such as an option to select a date from a calendar or options to input dates in a calendar format (e.g., Day/Month/Year). Further, the system may identify that the inserted customized name (Launch Date) relates to the Product Development or Project Management industry. The system may further suggest adding additional columns related to the customized text such as "Return on Investment," "Customer Satisfaction," "Actual Cost," "Cost Variance," "Cost Performance," and any other Product Development or Project Management industry categories that may be relevant to the customized heading.

By way of one example, if a user inserts "Litigation case" in place of "Item 1," the system may recognize the customized text in the row heading and perform a lookup to determine a data type associated with the inserted customized name. The system may identify that the inserted customized name (Litigation case) relates to an "item" data type. Further, the system may identify that the inserted customized name (Litigation case) relates to the Legal industry. The system may further suggest adding columns related to the legal industry such as "Law Firm," "Billing Rate," "Partner," "Associate," "Paralegal," and any other legal related categories.

In some embodiments, the system may scan different areas of a board to determine if the board is related to a specific use case (e.g., Customer Relationship Management (CRM), Research and Development (R&D), Information Technology (IT), Project Management Office (PMO), Legal, Human Resources (HR), and other fields) and provide suggestions for how to adapt the board (adding rows or columns, changing names of rows or columns, setting up automations and integrations) for more efficient use.

Aspects of this disclosure may include displaying, based on an identified data type, selectable options for values for an associated cell of an at least one customizable row heading or column heading. Displaying selectable options may include rendering digital buttons, selections, labels, or choices for a user to select. Selectable options may be available for any column type and may change based on whatever the column type is. Selectable options may be presented in any manner such as a drop down menu or list. The selectable options may populate in response to a user clicking a cell or may populate automatically after the system identifies a data type of at least one column or row.

Values may include any number, data, image, or text. For example, values for a column with a "status" data type may include "done," "working on it" and "finished" options for selection. Values for a column with a "Date" data type may include a calendar with multiple dates to select from. Values for a column with a "Person" data type may include images of people or names listed to select from.

In some embodiments, based on user customization (header or row customization, board name, column name, or row name), the system may provide a column suggestion, row suggestion, cell suggestion (of any row or any column), automation suggestion (e.g., if there is a new item, email Project Manager), or integration suggestion (e.g., integrating a third-party application—if there is a new item, pull information from Outlook calendar to insert into the item's status cell). By way of one example, if the user changes the column title to "In progress" in the heading, the system may recognize that it is a "status" data type and the system may then provide the user with pre-set options of "done" "stuck" and "in progress" as selectable options.

In some other embodiments, if a user changes a customizable column heading to "marketing campaign 2020," the board may trigger a notification, menu, or indication. The notification may state, for example, "we noticed you are building board directed to marketing activities, let me show you how to better your experience" and provide a selectable option to add a column that may be helpful to users in the marketing industry. Or, in some other embodiments, the notification may be suggestions to provide a varied board directed to a better experience based on the information inserted by the user. Another notification may be a suggestion to use Facebook advertisement integrations to input data from Facebook.

In some other embodiments, when a user inserts a title for a column on a board, the system may recognize that the board being built is a board that can fit to a template. The system may offer certain column suggestions rather than offering the full template (e.g., "Add this column"). If it is status column, the system may provide selectable options and values similar to those of the template. These system suggestions can spare the user time in building the board.

In some embodiments, displaying the selectable options includes displaying a drop down menu of options. For example, the selectable options may be provided to the user in a drop down menu. A drop down menu may include a picklist that allows a user to choose a value from a list. The selectable options in the drop down menu may populate in response to a user clicking a cell or may populate automatically after identifying a data type.

By way of one example as illustrated in FIG. 4, board 400 includes an interface displaying selectable options for values for an associated cell of a customized column heading. FIG. 4 illustrates a table having a customized column heading where a user customized column 402 from having a title of "Status" (shown in FIG. 3) to "Channel." As a result of the user inserting the customized column heading, the system may identify the customized name for that heading and perform a lookup to identify a data type associated with the customized name (the system may recognize a "Social Media" data type). As shown in FIG. 4, the system displays four selectable options for values for an associated cell of the customized column heading in a drop down menu including Facebook selectable option button 404, IG selectable option button 406, YouTube selectable option button 408, and Twitter selectable option 410. A user may select any of the selectable options using a cursor 318 to click the buttons in the drop down menu.

Aspects of this disclosure may further include, displaying selectable options that may include values that may be displayed in at least one button. A button may include any physical or digitally rendered element that sends a signal to indicate a selection. For example, a digital button may be associated with an option for insertion into an associated cell, as discussed previously above.

FIG. 4 shows a presentation of selection options that are each displayed in at least one button, as shown by Facebook selectable option button 404, IG selectable option button 406, YouTube selectable option button 408, and Twitter selectable option 410 of FIG. 4. Values for a column with a "Social Media" data type may include "Instagram," "YouTube," "Facebook," "Twitter," or any other value that is related to social media.

Some embodiments may include enabling selection of at least one option of the selectable options. Enabling selection may include allowing a user to choose something. By way of one example, a system may have an interface that is clickable (e.g., using a pointer or cursor as previously described above). In some other embodiments, a system may allow for selection of an option by typing, touching, dragging, dropping, or using any mechanism to show a selection.

Aspects of this disclosure may include associating a selected option with an associated cell in at least one row or column associated with at least one customizable row heading or column heading. Associating the selected option with the associated cell may include linking the option or containing the option within the cell in the row/column with the customized heading. Further, associating the selected option may include displaying the selected option in the corresponding cell. By way of one example, a board may have various rows of items and columns. When a user adds a "status" column from the column store, the fixed labels would be "done," "working on it," and "stuck." However, if the user changes the status column to have a customized column heading to something related to marketing, the system may provide labels (or selectable options for values an associated cell of the customized column) that are the same as the system's marketing label template. Once the user selects the customized label (or selected option) provided by the system, the system associates the selected option with the cell in the column associated with the customized column heading.

In some exemplary embodiments as illustrated in FIG. 4, if the system determines the user changed the name of a column to "Channel," in response to this determination, the selectable options for cells of that column will be changed to options like "Facebook," "Instagram," and "YouTube."

In some embodiments, the at least one processor may be configured to receive an insertion of a second customized name for a second customizable row heading or column heading. A second customized name may include a customized name that is different from the first customized name, without any determination of order or priority. By way of one example, a user may insert two customized column headings or two customized row headings. The user is not necessarily confined to inserting a single or two customized headings, since the user may insert any number of customized headings. In another example, the user may insert a first customized row heading in addition to a first customized column heading. In another example, the user may insert a first customized column heading in addition to a first customized row heading.

By way of an example illustrated in FIG. 3, a user may insert "Marketing Initiative Spring 2020" as the title or customized heading of item 304 in place of "Item 1." Then, the user may change the title of item 306 from "Item 2" to "Marketing Initiative Fall 2020."

By way of another example, illustrated in FIG. 3, user may insert "Marketing Initiative Spring 2020" as the title or customized heading of item 304 in place of "Item 1." Then, the user may change the title of column 312 from "Person" to "Website Metrics."

By way of another example, illustrated in FIG. 3, user may insert "Website Metrics" as the title or customized heading of column 312 in place of "Person." Additionally, a user may change the title of column 314 from "Status" to "Channel."

Aspects of this disclosure may include performing a second lookup of the second customized name in combination with the previously inserted customized name to identify a second data type associated with the second customized name. By way of one example, the system may perform multiple look ups for multiple customized names. In one embodiment, the second lookup may be a lookup using both the first and second customized names.

In some embodiments, the lookup may be contextual. Further, in some embodiments, the system may gain context from the first customized heading. By way of one example, a user may start typing in Chinese in one column and the system may recognize (by a lookup) the language in the first column. In response to the recognition, the system may suggest the date column be customized to Chinese format (e.g., second column gets context from first column).

By way of another example, if a user changed one column heading to "Project," then the system may determine that the project may have a deadline and the system may recommend changing the "Date" to be a "Due Date" column rather than just simply "Date."

Aspects of this disclosure may include displaying selectable options for second values for a second associated cell of the second customizable row heading or column heading.

By way of one example illustrated in FIG. 4, board 400 includes an interface displaying selectable options for values for an associated cell of a customized column heading. FIG. 4 illustrates a table having a customized column heading where a user customized column 402 from having a title of "Status" (shown in FIG. 3) to "Channel." As a result of the user inserting the customized column heading, the system may identify the customized name for that heading and perform a lookup to identify a data type associated with the customized name (the system may recognize a "Social Media" data type). Then, FIG. 3 illustrates a table displaying, based on the identified data type, selectable options for values for an associated cell of the at least one customizable row heading or column heading. As shown in FIG. 4, the system displays four selectable options for values for an associated cell of the customized column heading in a drop down menu including Facebook selectable option button 404. Additionally, the user may customize column 316 of FIG. 3 to have a customized column heading of "Deadline" 416 rather than "Date," as shown in FIG. 4. Then, the system may recognize the customized name for that heading and perform a lookup to identify a data type associated with the customized name (the system may recognize a "People" data type). In response, the system may display, based on the identified data type of "People," selectable options for values for a second associated cell of the at least one second customizable row heading or column heading. The system may then display images or text representing various selectable options for values for a second associated cell of the second customized column heading.

Some exemplary embodiments may include enabling selection of one of the second values. By way of one example, a system may have an interface that is clickable (using a pointer or cursor as discussed previously) to select the second values. In some embodiments, a system may allow for selection of the second value by typing, touching, dragging, dropping, or using any mechanism to show a selection. Some other embodiments may include populating the second associated cell with the second value upon selection of the second value, consistent with some embodiments of the disclosure discussed above. By way of one example, clicking the second value may populate the second associated cell with the selected value.

Figure 5:
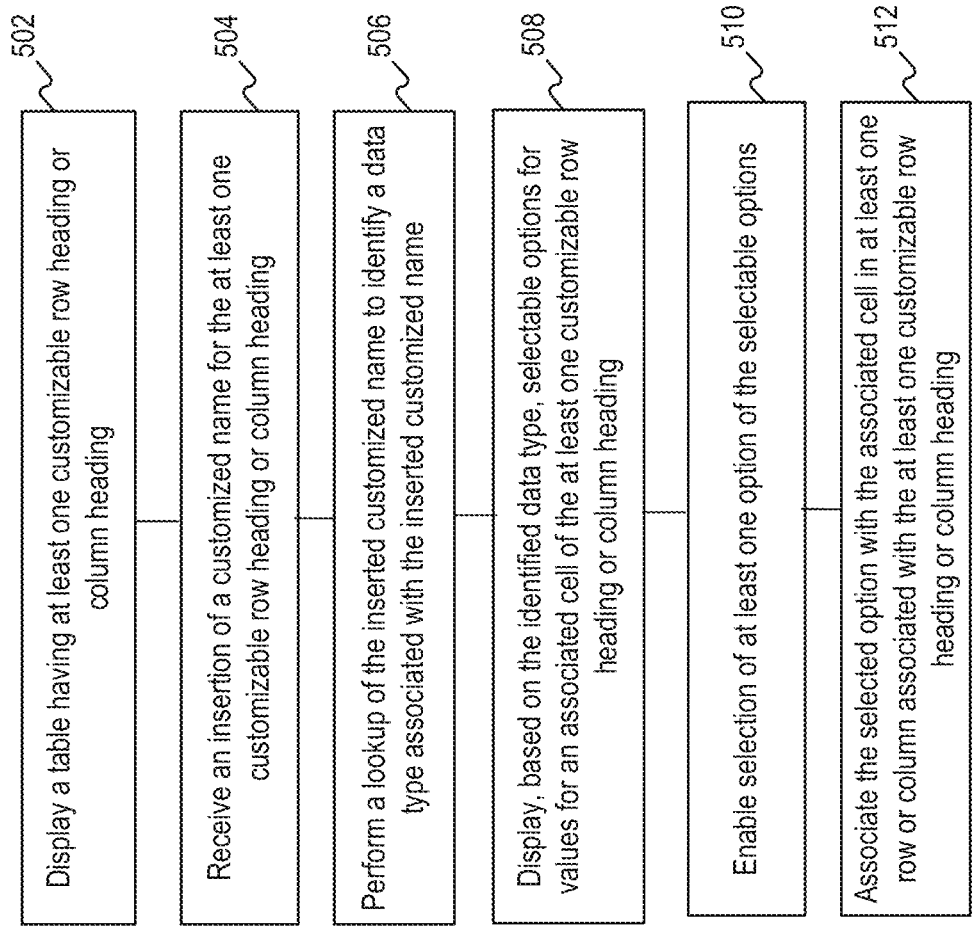
FIG. 5 illustrates a block diagram of method, consistent with some embodiments of the present disclosure.

FIG. 5 illustrates a block diagram of method 500 performed by a processor of a computer readable medium containing instructions, consistent with some disclosed embodiments. In some embodiments, the method may include the following steps:

Block 502: Display a table having at least one customizable row heading or column heading. In some embodiments, a user may access a data management platform and view tables with rows, columns, and cells to manage data. The user may change titles of any row or column.

Block 504: Receive an insertion of a customized name for the at least one customizable row heading or column heading. In some embodiments, the system may receive an altered name for a title of a column or row.

Block 506: Perform a lookup of the inserted customized name to identify a data type associated with the inserted customized name. In some embodiments, the system may search a database for a datatype related to the inserted title.

Block 508: Display, based on the identified data type, selectable options for values for an associated cell of the at least one customizable row heading or column heading. In some embodiments, the system may present a menu of options for cell values in the column or row with the customized title based on the identified data type.

Block 510: Enable selection of at least one option of the selectable options. In some embodiments, the system may allow a user to select within the menu of options using buttons.

Block 512: Associate the selected option with the associated cell in at least one row or column associated with the at least one customizable row heading or column heading. In some embodiments, the system may associate the option selected with a cell in the column or row with the customized title.

Aspects of this disclosure may relate to generating a hybrid table template pre-populated with data pulled from preexisting table, including methods, systems, devices, and computer readable media. For ease of discussion, a non-transitory computer readable medium is described below, with the understanding that aspects of the non-transitory computer readable medium apply equally to systems, methods, and devices. For example, some aspects of such a non-transitory computer readable medium may contain instructions that when executed by at least one processor, causes the at least one processor to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

Aspects of this disclosure may include storing a customized hybrid table-template definition. In some embodiments, a table may involve an arrangement of various cells. The cells may be arranged in horizontal and vertical rows (also referred to as rows and columns). Cells may be defined by intersections of rows and columns. Various rows or columns of the table may be defined to represent different projects, tasks, objects or other items, as well as characteristics of such items. For example, a horizontal row may represent an item and a vertical row may represent a status (which is a characteristic associated with the item). In some embodiments, the items in the table may be unifying rows or columns that represent projects, tasks, property, people, or any object, action, or group of actions that may be tracked. Additionally, the table, which may also be referred to as a board, include a matrix, or any grouping cells displaying various items. Some examples of items in the table may include workflows, real estate holdings, items for delivery, customers, customer interactions, ad campaigns, software bugs, video production, timelines, projects, processes, video production, inventories, personnel, equipment, patients, transportation schedules, resources, securities, assets, meetings, to do items, financial data, transportation schedules, vehicles, manufacturing elements, workloads, capacities, asset usage, events, event information, construction task progress, or any other objects, actions, group of actions, task, property or persons. A table may be considered distinct from another table if at least one of a row, column, contained information, or arrangement differs from that of another table.

A table template may be a rule, form, framework, or layout that defines the structure of a table. The table template may be customized in as much as it may be modified or built according to individual or personal specifications or preference, or may be built for a specific purpose. For example, a template may be specifically designed for a particular business or class of businesses, or for a particular vocation, situation, trade, line of work, or other undertaking. The table template may be hybrid in that it may include being from two or more states of being or may be combined from multiple sources or formats. For example, it may be a merger of types, arrangements, forms, compositions, layouts, structures, or systems. The table-template definition may characterize the template, specifying one or more of the template's structure, substructure, column headings, row headings, column interrelationships, interrelationships with other templates, or any other feature of the table-template. The definition may include a statement or a rule providing a distinctness in structure or presentation, or a combination thereof. For example, a customized hybrid table-template definition may include a rule or structure for a preselected format of a table. Additionally, a customized hybrid table-template definition may also include data-population rules associated with cells in the table (e.g., cells may contain predefined links to data in other tables). In some embodiments, when a table template is selected, a new table may be automatically generated with not only predefined rows and columns, but also with real-time data, in some of the cells, pulled from other preexisting tables. The customized hybrid table-template definition may be stored, meaning, for example, that it may be saved for later access. Such storage may occur in memory, regardless of the location and/or form of that memory. The definition may be stored by a user or it may be stored by a system provider or third-party provider. A customized template could be stored for use by a particular individual, a particular group of individuals, a particular company, or a particular industry or class of individuals.

Consistent with some aspects of this disclosure, a hybrid table-template definition may include a table format and at least one pre-population rule linking at least one cell of the hybrid table template with at least one cell of a preexisting table populated with data. A table format may include an arrangement or organization. In some instances, a table format may involve a particular predefined layout or arrangement of columns, rows, sub-columns and/or sub-rows. In other instances, the table format may specify at least one a cell type. A pre-population rule may include a set of conditions used to define data that may populate cells. Populated data may include any value, information, or entry that is associated with a data structure. For example, populated data may include date ranges, labels, financial information, names, individuals, contact information, location information, or any other data relevant to an associated endeavor.

In some embodiments, a pre-population rule may link at least one cell of a hybrid table template with at least one cell of a preexisting table that is already populated with data. A preexisting table may include any source of data (e.g., column, table, form, third party application in non-tabular format, third party application in tabular format, or any data structure). There may be different ways of populating data, whether from an original table or a setting, an external application, or internal application. For example, any data from any integrations with external applications can be used to populate at least one cell. Additionally, any data from another board can be a set value for populating one or more cells in another board.

In some embodiments, a user may generate a new board with default values including pre-defined columns and structures. The user may further choose which columns may be filled or populated with a default value. Automations and types of table views may also be copied as default values. In some embodiments, using a table format and pre-population rule may streamline table building, especially for users who generate multiple similar tables.

Figure 6:
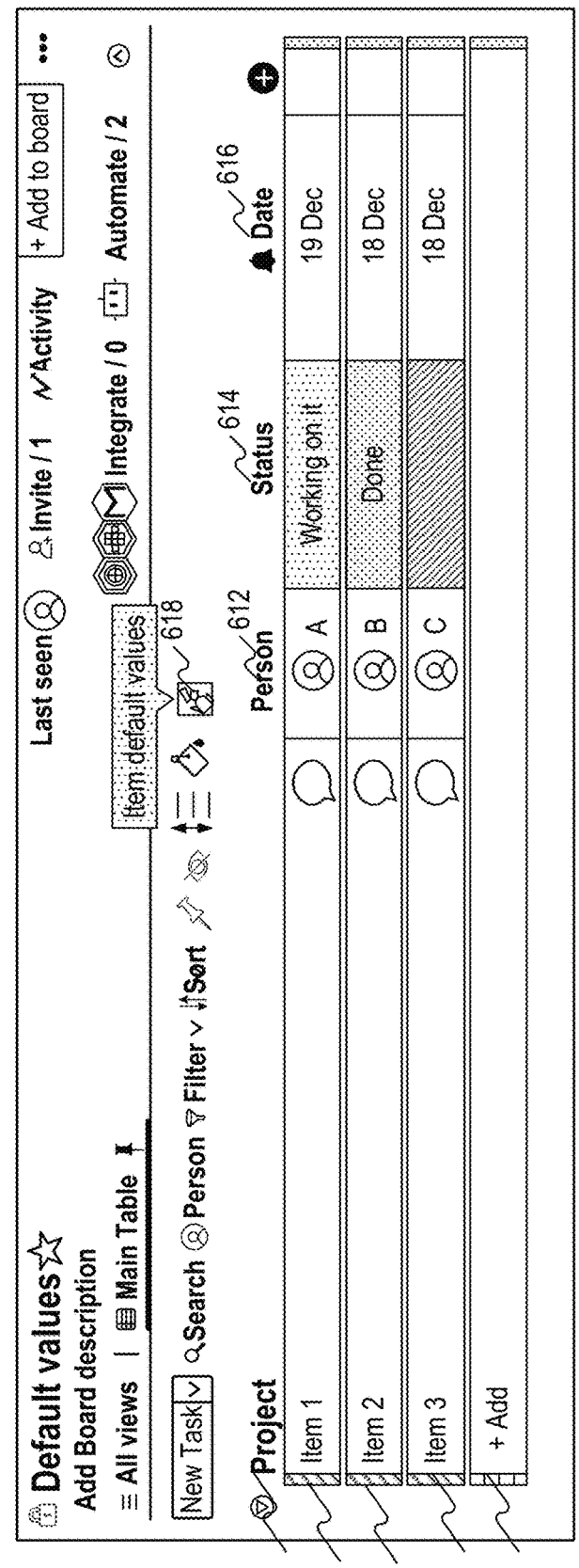
FIG. 6 illustrates an example of an interface with a first table containing various cells and a link to add and store a customized hybrid table template definition, consistent with some embodiments of the present disclosure.

By way of one example, board 600 of FIG. 6 presents a table (table 602) within a board. As illustrated in this example, there is a plurality of rows or items including "Item 1," 604, "Item 2," 606, and "Item 3," 608. Table 602 also includes a plurality of columns including Person column 612, Status column 614, and Date column 616. Additional columns and rows may be added by the user. Similarly, columns and rows maybe rearranged or removed by a user or the system.

As shown in FIG. 6, the cells of each item on table 602 are filled with data. For example, person cell of "Item 2," 606 is filled with Person B cell value/data. Status cell of "Item 2," 606 is filled with "Done" cell value/data. Date cell of "Item 2," 606 is filled with "18 Dec" cell value/data. Board 600 also includes an item default value icon 618, where a user may click to populate interface 700 of FIG. 7 and select default values for cells associated with a new item added to the table. Additionally, board 600 also includes add item icon 610, where a user may click to add a new item to board 600.

Figure 7:
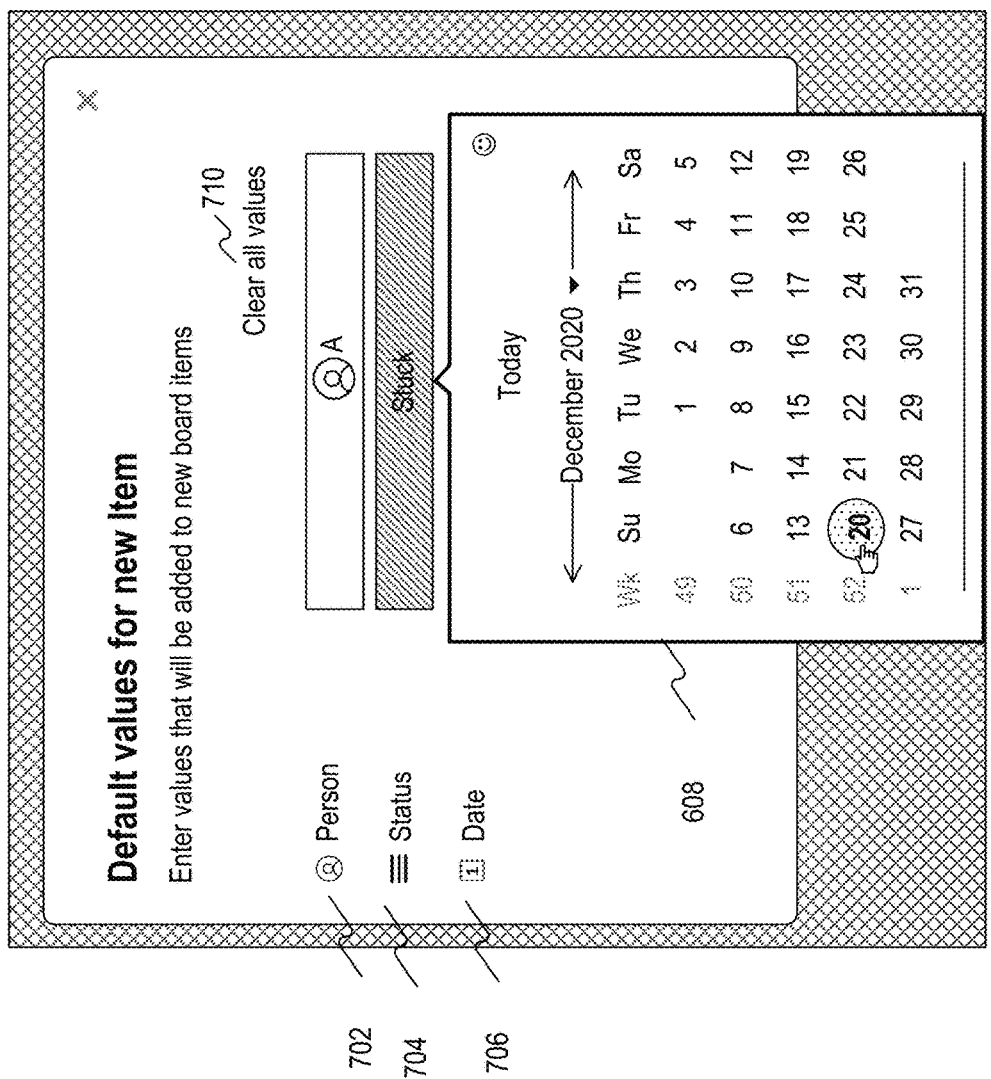
FIG. 7 illustrates an example of an interface for adding and storing a customized hybrid table template definition, consistent with some embodiments of the present disclosure.

Using interface 700 in FIG. 7, a user may define a hybrid table-template definition by selecting default values for new items added to a board. The default values selected generate the pre-population rules linking at least one cell of the hybrid table template with at least one cell of a preexisting table populated with data. Using interface 700 of FIG. 7, a user may also add new columns not originally on the table in order to change the table format.

In some embodiments with reference to FIG. 7, any values may be pre-populated. For example, a new board may be pre-populated partially (with just Person and Status cells) or fully (with all columns on a new board). In some other embodiments, a pre-population rule may be "Any new table starts with my name in the first column" to result in population of a name in the first column of any subsequent table that is generated.

Using interface 700 of FIG. 7, a user may enter default values that will be added to new board items. For example, the user may select cell values for Person 702, Status 704, and Date 706 using interface 700 that will populate on the board each time a new item is added, thereby generating a hybrid table-template definition that combines partial population of data with an otherwise empty table. The user may also use "Clear all values" icon 710 to clear the cell values associated with Person 702, Status 704, and Date 706. Interface 700 illustrates that the user selected "person A" for Person 702, "Stuck" for Status 704, and is currently selecting "Dec. 20, 2020" for Date 706. The user may save changes of selected default values and return to the table shown in FIG. 6. Then, if the user clicks add item icon 610 of FIG. 6 or FIG. 8, a new item is generated and each of the cells associated with that item (person, status, and date) are populated with values that were previously set using interface 700 of FIG. 7. For example, as shown on interface 800 of FIG. 8, after the new item is generated, default values are inserted into appropriate cells, for example, person cell 804 is filled with "person A," status cell 806 is filled with "stuck," and date cell 808 is filled with "20 Dec."

In some embodiments, if the configuration of the default items occur after there are already rows on the table, the configuration might not affect preexisting rows. In some embodiments, default values may be re-configured.

Aspects of this disclosure may involve at least one pre-population rule linking at least one cell of a hybrid table template with at least one cell of a preexisting table including a plurality of pre-population rules linking a plurality of cells from a plurality of preexisting tables with the hybrid table template. In some embodiments, there may be multiple pre-population rules linked from multiple tables. In some other embodiments, there may be two or more pre-population rules interacting with a single table. For example, a second pre-population rule generated from a second interface (different from interface 700) may link cells to a preexisting table at the same time as a first pre-population rule generated from interface 700.

In some embodiments, a hybrid table template may include a plurality of cells, a first portion of which may be linked to a preexisting table via a corresponding pre-population rule and a second portion of which may be unlinked to a preexisting table. As previously discussed, a pre-population rule may include a set of conditions used to define data that may populate cells. A corresponding pre-population rule may be one that is associated with a preexisting table, such as a default values table from which the pre-population rule draws information. A second portion may be unlinked to a preexisting table in that there are no such conditions. In some embodiments, some cells of the table may be filled with default values based on the association with the preexisting table and population rule while some cells of the table may remain empty or filled by other mechanisms (e.g., static default values that are not drawn from any preexisting table).

By way of example, using interface 70 of FIG. 7, a user selected "person A" for Person 702, "Stuck" for Status 704, and left Date 706 blank before saving changes of selected default values and returning to the table shown in FIG. 6. Then, if the user clicks add item icon 610 of FIG. 6 or FIG. 8, a new item is generated and each of the cells associated with that item (person, status) may be populated with values that were previously set using interface 700 of FIG. 7.

However, cells associated with the date column will be left blank because no default value was selected for Date 706. Specifically, the first portion of cells (person and status column cells) are linked to a preexisting table via a corresponding pre-population rule (generated in FIG. 7) and a second portion of cells (date column cells) are unlinked to a preexisting table. In another example not shown, the second portion of cells (date column cells) could be populated with the date of adding that particular item, which draws information from an internal clock associated with the system. This exemplifies some other embodiments where the second portion of cells are unlinked to a preexisting table, but may still be populated by another mechanism.

Aspects of this disclosure may involve at least one pre-population rule drawing from at least one preexisting table at least one of a capacity, a count, an identity, a budget, variable numerical data, a timeline value, a status value, and a progress value. A count may include any numerical value or data indicating a tally. An identity may include any distinguishing information, value, or data (such as a person assignment). A budget may include any numerical value or data (e.g., numerical or graphical). Variable numerical data may include any numerical value or data that may be updated dynamically (e.g., periodically or in real time). A timeline value may include information associated with a date, time, or length of time (such as a due date) in a textual or graphical format. A status value may include any representative value (alphanumerical or graphical) or data (such as "done" or "working on it"). A progress value may include any numerical or graphical value (such as the amount of development in a project) that indicates an extent of completion associated with an item.

Aspects of this disclosure may include receiving a request to generate a new table using a hybrid table template definition. A request may include any indication either from a user or a system. The request may be to generate a new table that previously did not exist, using the hybrid table template definition, as previously described. The request may be received in response to a gesture or selection in an interface (e.g., physical device such as a mouse or keyboard, or digital activation through a virtual button).

Figure 8:
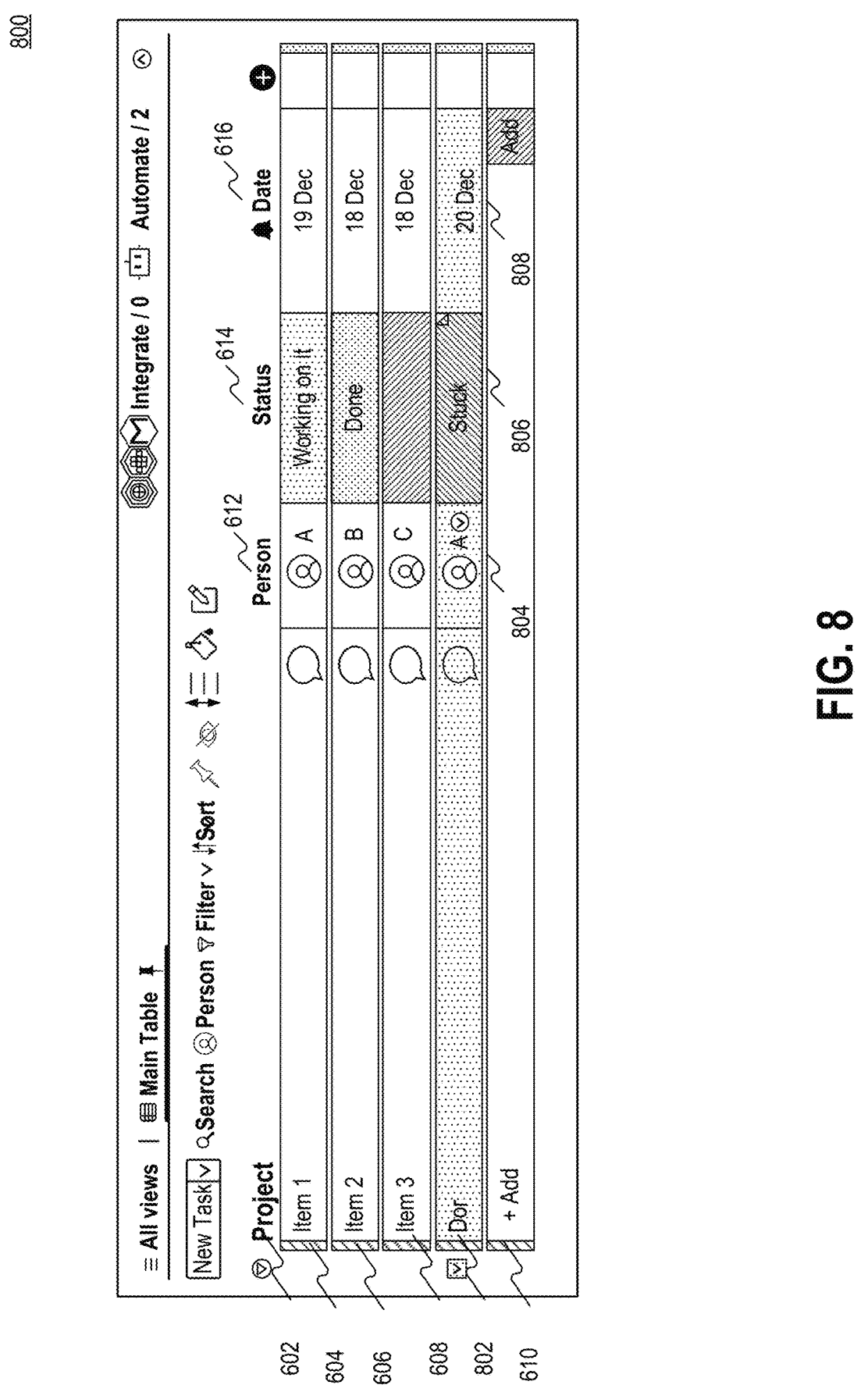

For example, a request may be received from a user clicking an "add item" icon 610 of FIG. 6 or FIG. 8 to generate the new item and fill cells associated with that item (person, status, and date) with values that were previously set using interface 700 of FIG. 7. In some embodiments, another button may be used to generate a new table. In yet some other embodiments, a condition being met (e.g., "when Status is Done") may cause an activation of a request to generate a new table.

Aspects of this disclosure may include a pre-population rule configured for dependency on other data in a new table, wherein pre-population may occur after other data is entered in the new table. Dependency on other data may include activating a function or action in response to a condition met (e.g., data population in a cell). For example, a pre-population rule may depend on the population of a date (e.g., an initial date) in a cell of the table before the system populates other cells with other dates (e.g., deadlines of sub-tasks based on the initial date).

In one example, in FIG. 11, pre-population occurs after other data is entered into the table. For example, FIG. 9 illustrates an example of an interface for adding and storing a customized hybrid table template definition, namely, adding a default value of "D" for "person" and a default value of "done" for "status."

In some embodiments, using interface 900 a user may select default values for new items added to a board. Specifically, a user may enter values that will be added to new board items. For example, the user may select cell values for some or all of Person 902, Status 904, Date 906, Dropdown 908, Formula 910, Agenda 912 (or other fields) using interface 900 that will populate on the board every time a new item is added. The user may also use "Clear all values" 916 to clear the cell values associated with Person 902, Status 904, Date 906, Dropdown 908, Formula 910, and Agenda 912. Interface 900 illustrates that the user selected "person D" for Person 902, "Done" for Status 904, and has not yet selected a default value date for Date 906. The user also has not selected default values for Dropdown 908, Formula 910, Agenda 912. The user may save changes of selected default values.

Figure 9:
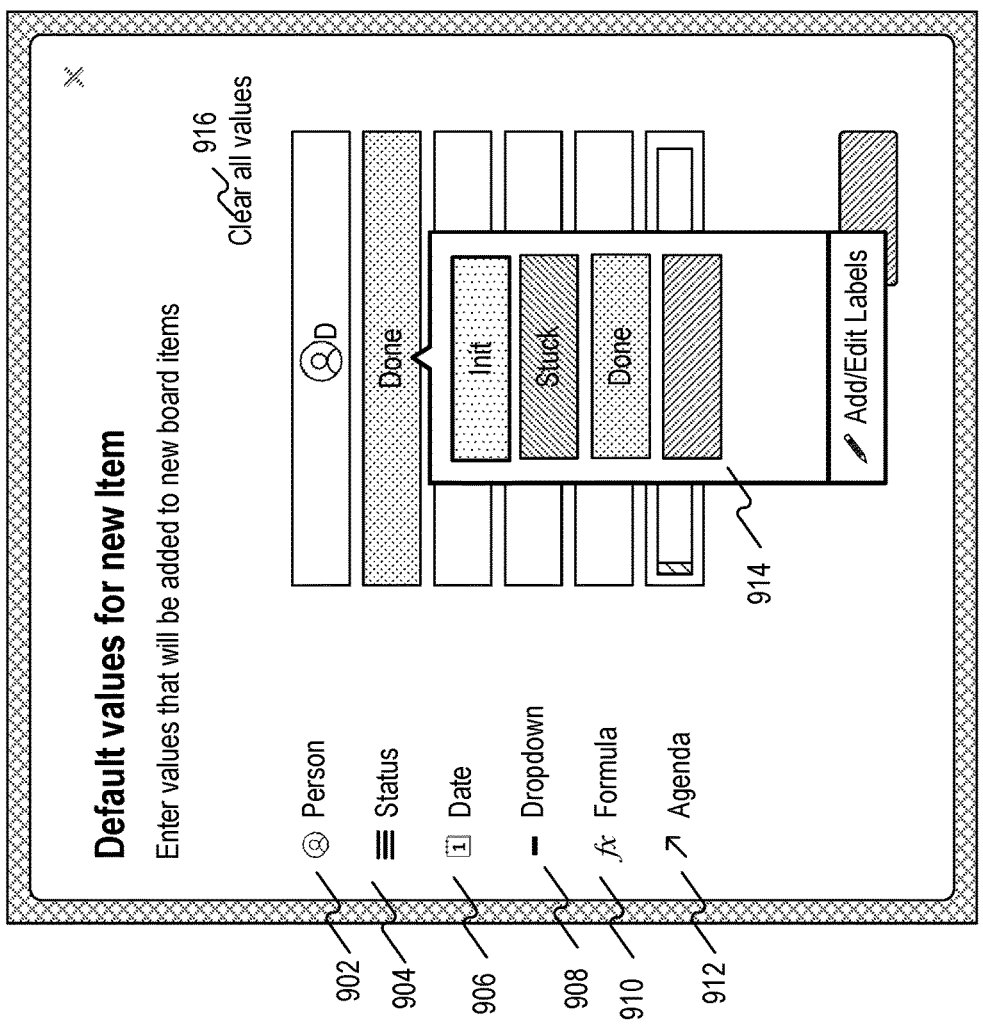
FIG. 9 illustrates a second example of an interface for adding and storing a customized hybrid table template definition, consistent with some embodiments of the present disclosure.
Figure 10:
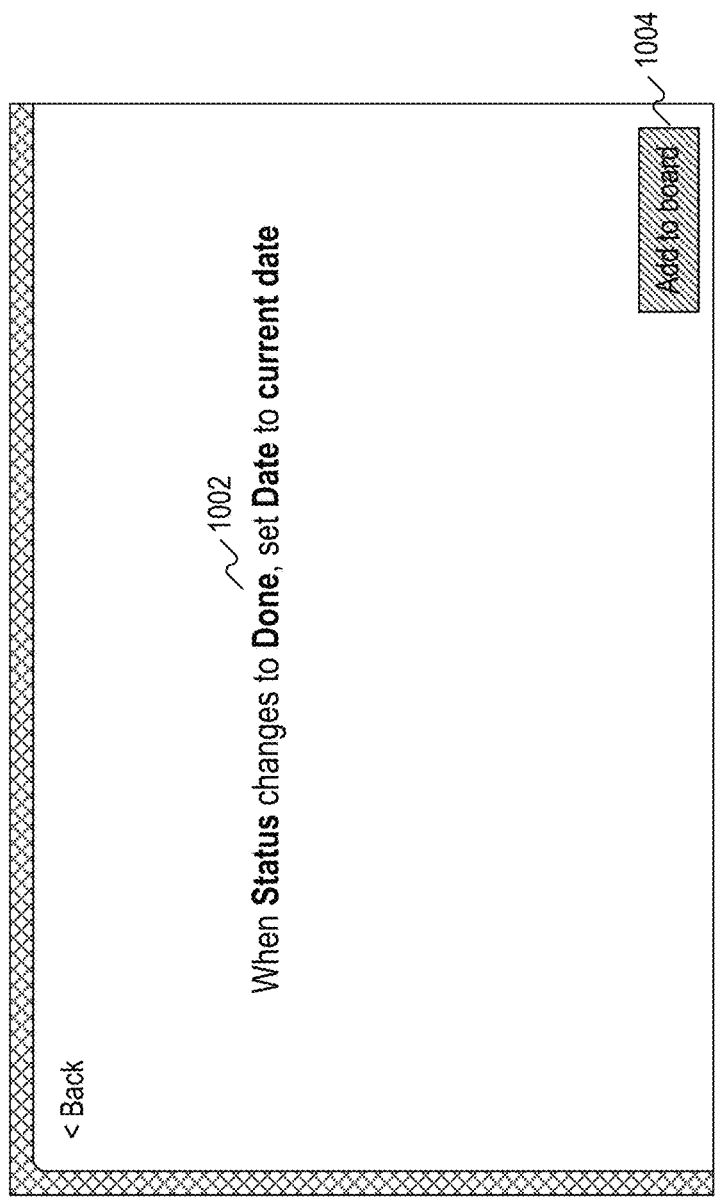
FIG. 10 illustrates an example of an interface for adding an automation that interacts with the stored customized hybrid table template definition defined in FIG. 9, consistent with some embodiments of the present disclosure.

Additionally, FIG. 10 illustrates an example of an interface for adding an automation that interacts with the stored customized hybrid table template definition defined in FIG. 9. Automation 1002 shown in FIG. 10 indicates that when a status changes to "done," a date will be sent to the current date (configured for dependency on other data in the new table).

If the user clicks add item icon 610 of FIG. 11, a new item is generated and each of the cells associated with that item (person and status) defined with default values are populated with values that were previously set using interface 900 of FIG. 9. Thus, in FIG. 11, when new item Kate 1102 is added, the "person" and "status" fields are filled with default values in accordance with the customized hybrid table template definition shown in FIG. 9. For example, as shown on interface 1100 of FIG. 11, after the new item is generated, person cell 1104 is filled with "person D" and status cell 1106 is filled with "done." The date, dropdown, and formula cells are not immediately filled because the user did not define default values for Date 906, Dropdown 908, Formula 910, and Agenda 912 on interface 900 of FIG. 9. However, because of the automation described with reference to FIG. 11, once data (Status changes to "Done") is entered into the "status" field of FIG. 11, pre-population occurs, and data is entered into the new table (date in the date field changes to the current date & time in accordance with the automation defined in FIG. 10). Accordingly, the pre-population in Date 1108 occurs only after other data (Status changes to "Done") is entered in the new table as a cascading default value.

In some embodiments, an automation may include "When the status changes to 'Done,' do 'something' on 'Date.'" For example, the system may send an email or text on the date that the status changes.

In some other embodiments, there may be conditional default values. For example, if X happens, the item will be generated with values A, B, C. If Y happens, the item will be generated with values D, E, F.

Aspects of this disclosure may include generating a new table following receipt of a request. In some embodiments, when a new item (row) on a board is generated, it may be automatically filled with pre-defined values. Generating may include following a link to access real-time cell data from a preexisting table, and migrating the real-time cell data to the new table. In some embodiments, real-time cell data may refer to data in the cell of the preexisting table at the time of the migration. Migrating the real-time cell data to the new table may include moving or copying data from one area to another area.

In some embodiments, generating a hybrid table template pre-populated with data pulled from preexisting tables may save manual work, especially for boards with many columns. For example, instead of configuring an automation for each column and setting each one to be triggered from row generation, all columns may be configured once as part of a dedicated user interface for this feature (e.g., When an item is added to the board, change status column to "Working on it;" when an item is added to the board, change Deadline column (a date type column) to a week from generation; when the default row values are generated, an automation is generated in the background; when a row is generated due to a separate automation or integration that triggered the row generation—the default values would be applied).

Aspects of this disclosure may involve real-time cell data being variable, wherein the at least one processor may be configured such that when the real-time data is updated in the preexisting table, an update automatically occurs via the link to the new table. Variable real-time cell data may include data that may change after migration, or data that may change as a result of any other update. When this happens, a link to the new table may enable an update to occur automatically. In some embodiments, default values may be re-configured after a change occurs.

Aspects of this disclosure may involve receiving a request to alter a stored hybrid table template definition based on data in the new table. In some embodiments, the stored hybrid table template definition may be modified by a user or system in response to new values in various cells. As a result, the stored hybrid table template may be stored in a modified state for later application. Aspects of this disclosure may include altering the stored hybrid table template definition based on a sub-selection of data in the new table. A sub-selection of data may include data of a cell beneath, within, or otherwise associated with a cell of the new table. In some embodiments, the stored hybrid table template definition may be modified by the user or system in response to new values or new selections in a portion of one or more cells.

Figure 12:
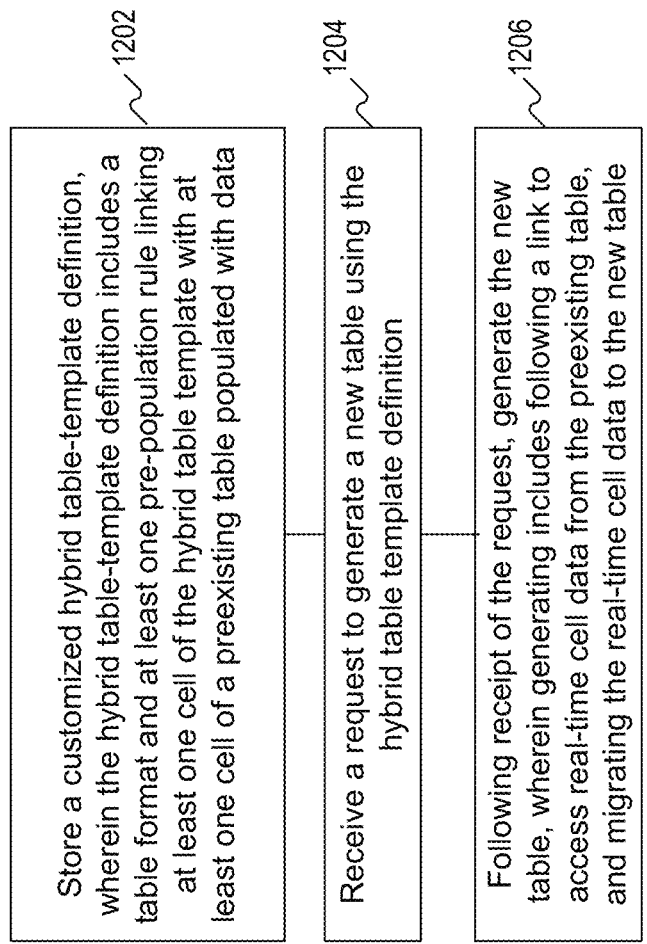
FIG. 12 illustrates a block diagram of method 1200 performed by a processor of a computer readable medium containing instructions, consistent with some embodiments of the present disclosure.

FIG. 12 illustrates a block diagram of method 1200 performed by a processor of a computer readable medium containing instructions, consistent with some disclosed embodiments. In some embodiments, the method may include three steps:

Block 1202: Store a customized hybrid table-template definition, wherein the hybrid table-template definition includes a table format and at least one pre-population rule linking at least one cell of the hybrid table template with at least one cell of a preexisting table populated with data. In some embodiments, a user may write a definition or make selections to generate a definition such as "When Status is Done, enter current Date."

Block 1204: Receive request to generate a new table using the hybrid table template definition. In some embodiments, the system may receive a selection from a user that triggers a hybrid table template definition to complete a function such as adding cell data to a table from a preexisting table.

Block 1206: Following receipt of the request, generate the new table, wherein generating includes following a link to access real-time cell data from the preexisting table, and migrating the real-time cell data to the new table. In some embodiments, the system may generate an updated table on a graphical user interface. The updated table may include cell data from preexisting tables.

Aspects of this disclosure may provide a technical solution to challenges associated with collaborative work systems. Some disclosed embodiments include methods, systems, devices, and computer-readable media. For ease of discussion, example system for representing data via a multi-structured table is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

As another example, some aspects of such system may be implemented as operations or program codes in a non-transitory computer-readable medium. The operations or program codes may be executed by at least one processor. Non-transitory computer readable mediums, as described previously, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for representing data via a multi-structured table having at least one processor (e.g., processor, processing circuit or other processing structure described herein) in collaborative work systems, including methods, devices, and computer-readable media. A multi-structured table may refer to one or more tables having a structure with a set number horizontal and vertical rows (e.g., rows and columns). A multi-structure table may also include a main table with a first structure and a sub-table with a second structure. A table may be in a form of a board, an array, a grid, a datasheet, a set of tabulated data, a set of comma separated values (CSV), a chart, a matrix, or any other two-dimensional or greater systematic arrangement of data. A row may be viewed as a range of cells, nodes, or any other defined length of data types that fully or partially extend across the table. A column may be viewed as a range of cells, nodes, or any other defined length of data types that extend transverse to the direction of a row in a table.

A structure may refer to the arrangement and organization of interrelated or unrelated elements containing data where the structure may include an array of tables, a hierarchy of tables (a cascade of one-to-may relationships), a network of tables featuring many-to-many links, or a lattice of table featuring connections between elements of the table. The structure of the one or more tables may be the same or different in the number of rows and/or columns. In addition, the cells in the rows and columns of a table may also contain an embedded or nested table or sub-table (e.g., a sub-board). The sub-table may also consist of a structure having the same or different number of rows and/or columns to other tables, or the main table containing the sub-table. The multi-structured table may refer to one or more separate tables with the same or different structure. Furthermore, the multi-structured table may have one or more sub-tables in cells with the same or different structure from one another or from non-sub-tables. For example, the multi-structured table may have a first group containing one or more tables having the same structure consisting of a set number of columns and rows, and a second group containing one or more tables with differing structures from one another. In addition, one or more cells of a table may contain a sub-table, which may be embedded, having a structure that may be the same or different from the tables in the multi-structured table.

Figure 13:
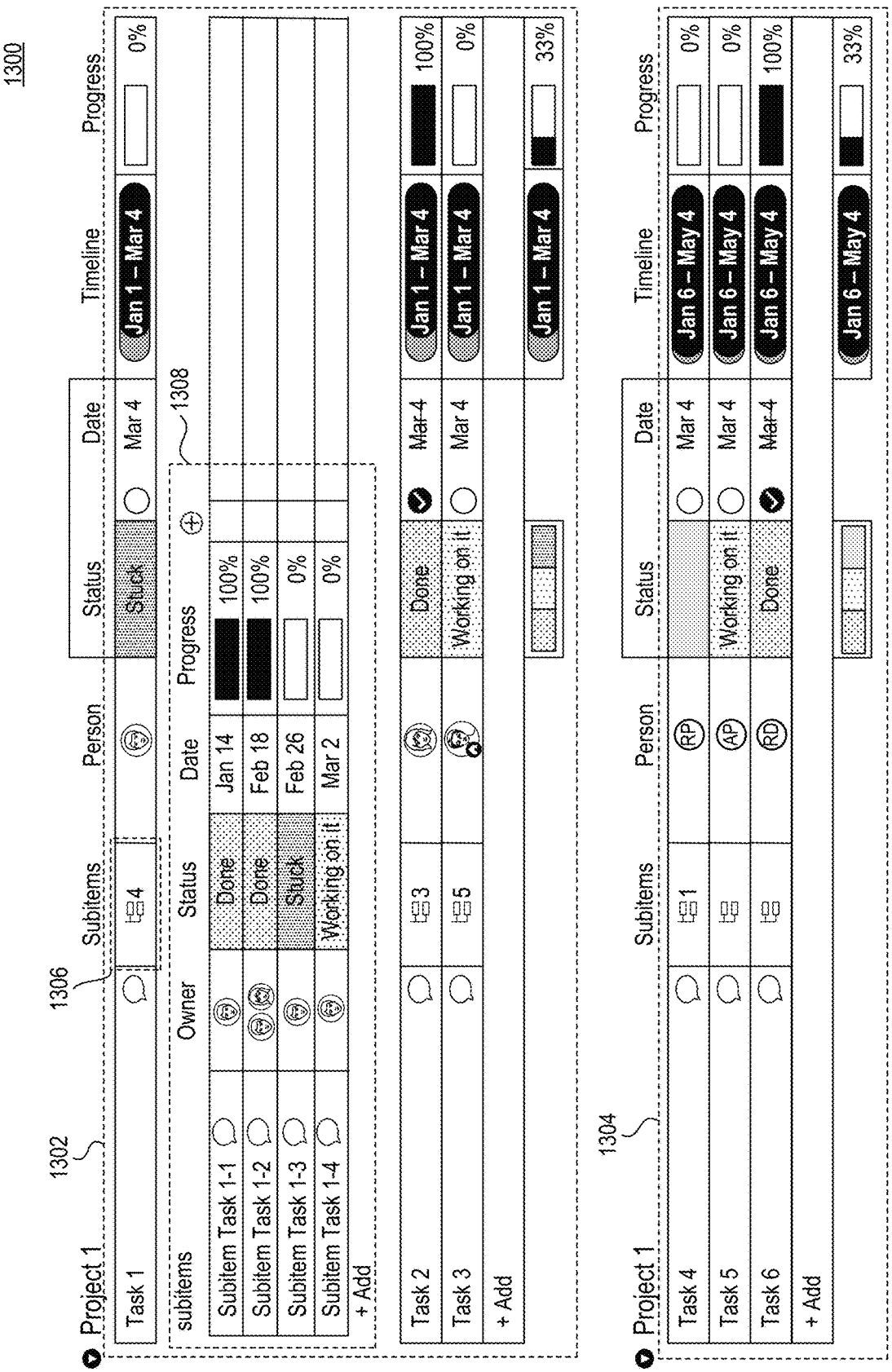
FIG. 13 illustrates an example view of representing data via a multi-structured table, consistent with some embodiments of the present disclosure.

By way of example, FIG. 13 illustrates an example view of representing data via a multi-structured table, consistent with some embodiments of the present disclosure. FIG. 13 may include a multi-structure table 1300 having a first table 1302 and a second table 1304. The first table may be structured with a plurality of rows and columns displaying data. The second table may have the same structure as the first table. Furthermore, cell 1306 may contain an embedded or associated sub-table 1308 having a different structure from the first table and the second table. The sub-table may have its own number of rows and columns that may be different or the same as the structure of the first table and/or the second table.

In some disclosed embodiments, at least one processor of the system may carry out operations that may involve maintaining a main table having a first structure and containing a plurality of rows. A main table may refer to one or more tables that primarily contain and display data or information. A main table may have horizontal and vertical rows (e.g., rows and columns) containing cells with data or information. Furthermore, the main table may have a first structure where the table may consist of a number of columns and rows. The columns of the main table may be organized with headings such that each column may represent the same or different data or information. The headings of the columns may identify information or characteristic types associated with the data in the main table. For example, each column may have a heading, appearing, for e.g., at the top of each column, such as status, person, list of text or numbers, time, timeline, date, icon of checkbox, file location, hyperlink, metadata, address, contact information, a mirrored column (e.g., duplicated information or linked to other sources of information), or any other data type that may be contained in a column. The rows of the main table may be organized to provide detail data about each column. For example, a main table may have a first structure consisting of five columns each representing certain information such as tasks, people, status, timelines, and progress of the tasks. The first structure of the main table may further have a plurality of rows, for e.g., seven rows, each providing data in cells for each column. Moreover, other tables in the main table may have the same or different first structure.

Figure 14:
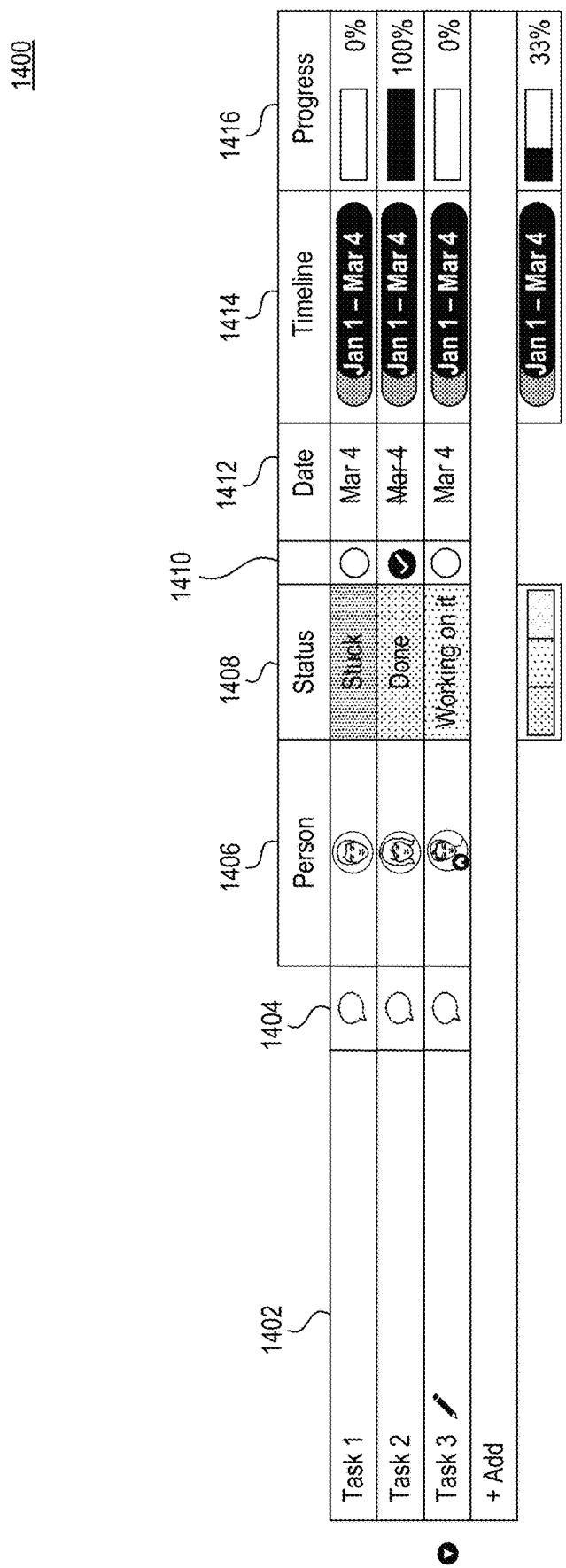
FIG. 14 illustrates an example view of a main table having a first structure with a plurality of rows, consistent with some embodiments of the present disclosure.

By way of example, FIG. 14 illustrates an example view of a main table having a first structure with a plurality of rows, consistent with some embodiments of the present disclosure. FIG. 14 may include main table 1400 having a first structure consisting of eight columns (Task 1402, Message 1404, Person 1406, Status 1408, Deadline Status 1410, Date 1412, Timeline 1414, Progress 1416) and three rows of data relating to Tasks 1 to 3. The columns of the main table may include a task column 1402, a message column 1404, a person column 1406, a status column 1408, a deadline status column 1410, a date column 1412, a timeline column 1414, and a progress column 1416. Furthermore, the main table main may include three rows having cells for each of the columns. The task column 1402 may contain three rows each with "Task 1," "Task 2," and "Task 3."

In some embodiments, at least one processor of the system may carry out operations that may involve receiving a first electronic request for establishment of a first sub-table associated with a main table, wherein the first electronic request includes column heading definitions and wherein the column heading definitions constitute a second structure.

A first electronic request may refer to an electronic signal containing instructions that may be configured to trigger an alteration of data associated with the main table, such as the addition, deletion, rearrangement or any other modification or combination thereof. The request may be in one or more digital, electronic, and/or photonic signals that may be received via a voice command, gesture, touch, tap, swipe, a cursor selection, cursor scrolling, or a combination thereof. A first sub-table may refer to a nested or embedded table contained within a row or a cell (any cell, including the heading cell) of the main table, as defined above. In some embodiments, the first sub-table may have the same characteristics (data, objects, date ranges, text, tally, or any other quantitative or qualitative summary information) and functions (display of data or information) as the main table. For example, the first sub-table may have a second structure, which may be different or the same as the first structure of the main table, as defined above. The second structure of the first sub-table may include horizontal and vertical rows (e.g., rows and columns) containing cells with data or information. The first sub-table may also include column heading definitions. The column heading definitions may include headings, appearing at the top of each column, such as, for example, subitems, status, person, list of text or numbers, time, timeline, date, icon of checkbox, file location, hyperlink, metadata, address, contact information, a mirrored column (e.g., duplicated information or linked to other sources of information), or any other data type that may be contained in a column. In some embodiments, the column heading definition may include different formats and constraints on formats that may affect the size, font, and color of values, objects, images, views, orientations, or displays in the second structure. The rows of the first sub-table may be organized to provide detail data about each column. For example, the first electronic request may be transmitted by a user by clicking a drop-down menu that may list "Add Subitem," or the first electronic request may include clicking on a cell in the main table that may prompt a user to "Add Subitem." Upon the execution of the first electronic request, the at least one processor may generate a sub-table having a second structure consisting of, for example, six columns with column heading definitions as subitems of tasks, people, owner, status, timelines, and progress of the tasks, or any other heading definitions. The second structure of the sub-table may further have, for example, a plurality of rows or nine rows each providing detailed data in cells for each column under their respective column heading definitions. The sub-table may also be referred to as a subitem associated with a row of the main table.

Figure 15:
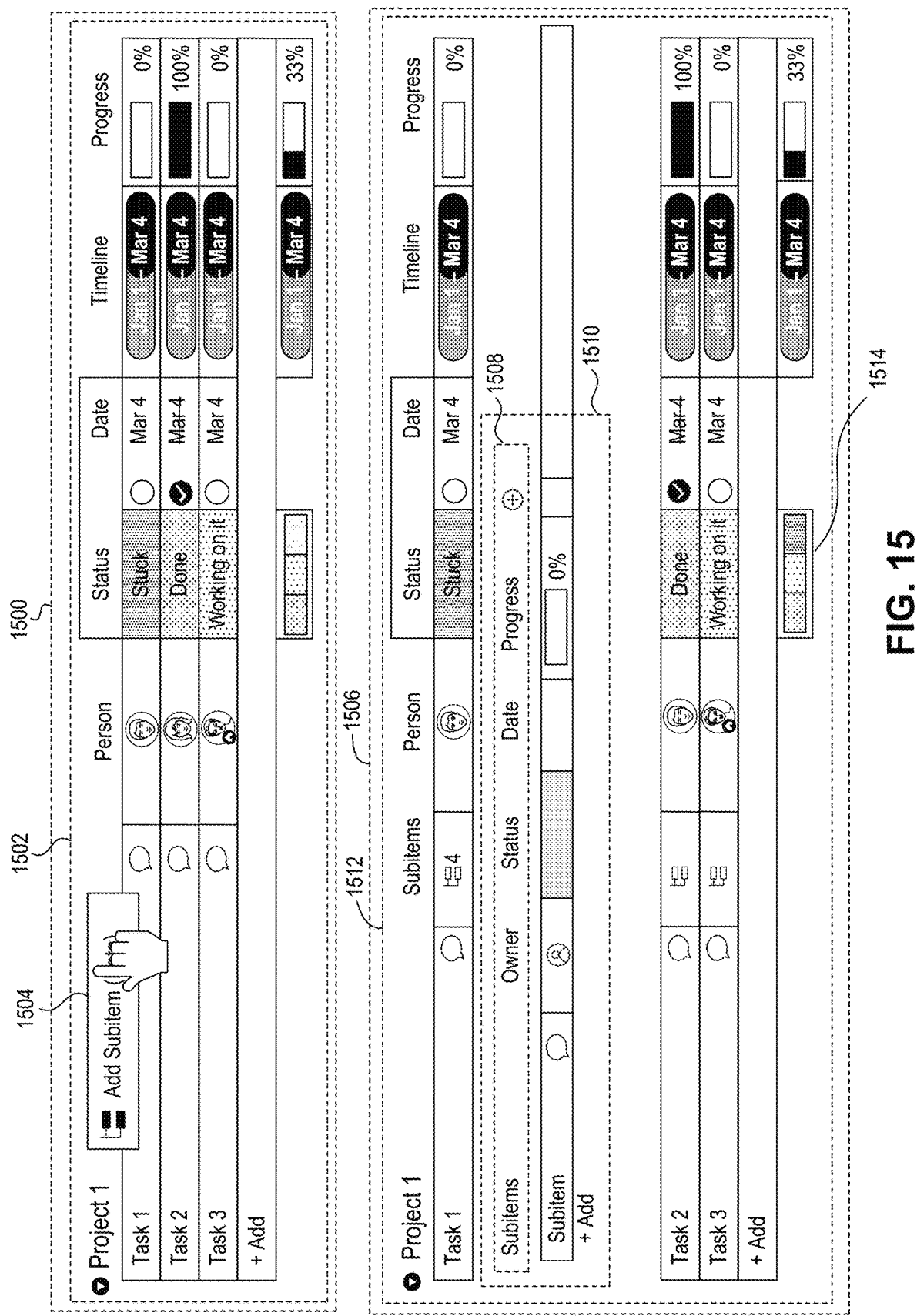
FIG. 15 illustrates example views of a first sub-table associated with a main table having a second structure with column heading definitions, consistent with some embodiments of the present disclosure.

By way of example, FIG. 15 includes the first view 1500 having a main table 1502. The at least one processor may receive a first electronic request such as a click to "Add Subitem" 1504 or the first sub-table associated with the main table. In the second view 1506, as a result of adding the subitem, a first sub-table 1508 may be generated having a plurality of column heading definitions 1510. The column heading definitions 1510 may constitute the second structure of the sub-table 1508 where the headings may be subitem names, owner indicators, statuses, and dates, or any other definitions that a user may choose. The sub-table 1508 may be associated with main table 1512, which is the same as main table 1502 in the first view.

In some embodiments, at least one processor of the system may carry out operations that may involve storing a second structure in memory as a default sub-table structure. A default sub-table structure may refer to an initial setting, a preset setting, or a preexisting configuration for the second structure of the sub-table where the second structure may automatically be applied to any subsequent sub-tables. After the first electronic request establishes the second structure of the first sub-table, the at least one processor may store the default sub-table in memory for assignment of the second structure to any later generated sub-tables or subitems. For example, the default sub-table structure may consist of a certain number of column heading definitions, and the same column heading definitions may then be applied to any later generated sub-table. The default sub-table structure may also include varying formats and constraints on table structures (e.g., permission settings or structural constraints) as discussed above. The default sub-table structure associated with the second structure may be modified to have additional column heading definitions as needed by a user.

Consistent with some disclosed embodiments, at least one processor of the system may carry out operations that may involve associating a first sub-table with a first row in a main table. The first sub-table may be embedded or nested under the first row of the main table such that the first row of the main table may expand to display the first sub-table, but the other rows of the main table may be collapsed to not display another sub-table, or the other rows may not have any sub-tables. In addition, the first sub-table may also be associated with a cell inside the first row of the main table. Alternatively, the first sub-table does not necessarily need to be limited to the first row of the main table and may generally be a sub-table that is first generated with any row of the main table. That is, in general, a sub-table (e.g., first sub-table) may be associated with any row of the main table.

By way of example, FIG. 15 includes in the second view 1506 a default sub-table structure 1510 that may include a column heading definition 1508. After receiving the first electronic request, the at least one processor may automatically store the default sub-table structure associated with the second structure of the first sub-table in memory for later application.

Figure 16:
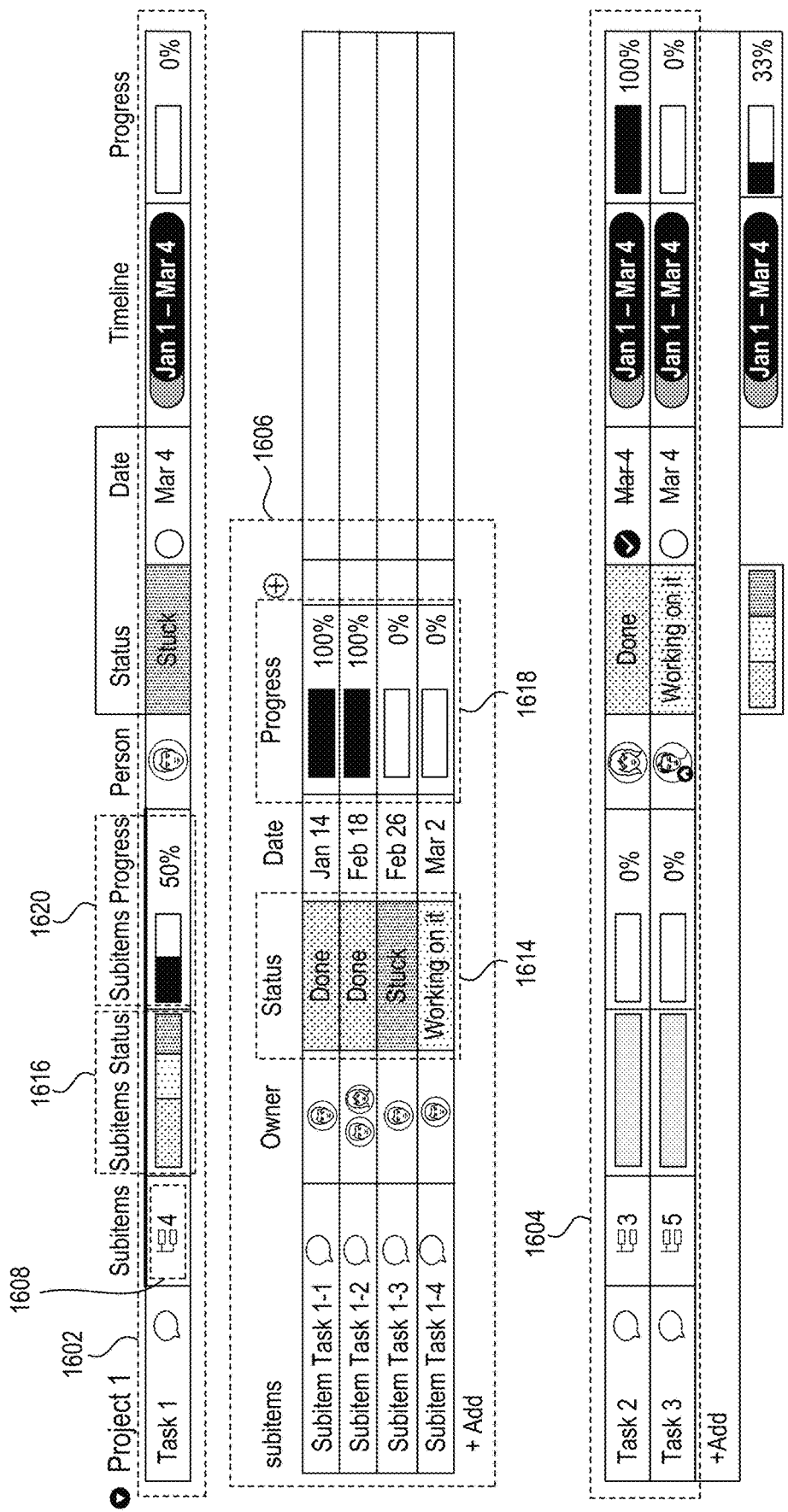
FIG. 16 illustrates an example view of the first sub-table with a first row in the main table, consistent with some embodiments of the present disclosure.

In another example, FIG. 16 includes a main table 1600 with a first row 1602 and two other rows 1604. The first row 1602 when expanded may display the first sub-table 1606 where the first sub-table may be positioned between the first row and the second row of the main table. As discussed above, the first sub-table is not limited to the first row of the main table, and instead may be associated with any row of the main table. The first sub-table 1602 may have automatically adopted the default sub-table structure stored in memory of the system for representing data via a multi-structured table. In addition, the first sub-table 1602 may have a column heading definition that may include the headings for "subitems," "owner," "status," "date," and "progress." In addition, the first sub-table 1606 may have four rows containing detailed data regarding the column heading definitions, such as "SubitemTask 1-1" through "Subitem Task 1-4" as shown in FIG. 16.

In some embodiments, the at least one processor may receive a request to update data in a first sub-table, wherein the update does not alter data in the main table. Updating data in the first sub-table may refer to changing, deleting, creating, altering, rearranging, adding, modifying, or renewing the values of the data, the format of the data, the constraints of the data, the display of the data in the column heading definition, or any of the rows or cells inside the first sub-table. For example, changing the status from "in progress" to "done" may be considered to be updating data in the first sub-table. In response to the update in the first sub-table, updating a graphical representation of the sub-table may include changing a size of at least one of the plurality of graphical representations. In another example, a column may contain three statuses marked as "done," and two statuses marked as "in progress." One of the "in progress" statuses may be updated to "done," resulting in a total of four "done" statuses and one "in progress" status. Altering data in the main table may be synonymous to "updating," as defined above for the main table. Not altering data in the main table may include the lack of an update in the main table despite there being an update in a first sub-table. This may be a result of the fact that the structure of the first sub-table is independent from the structure of the main table. For example, the system may add a column heading definition, such as "time tracker," in the first sub-table, which may not subsequently add the same column heading definition to the main table. In another example, the modification of a value in the cell of the first sub-table may not also subsequently alter any of the cells of the main table. Alternatively in some other embodiments, a change in a cell of the first sub-table may subsequently alter one or more cells in the main table.

Figure 17:
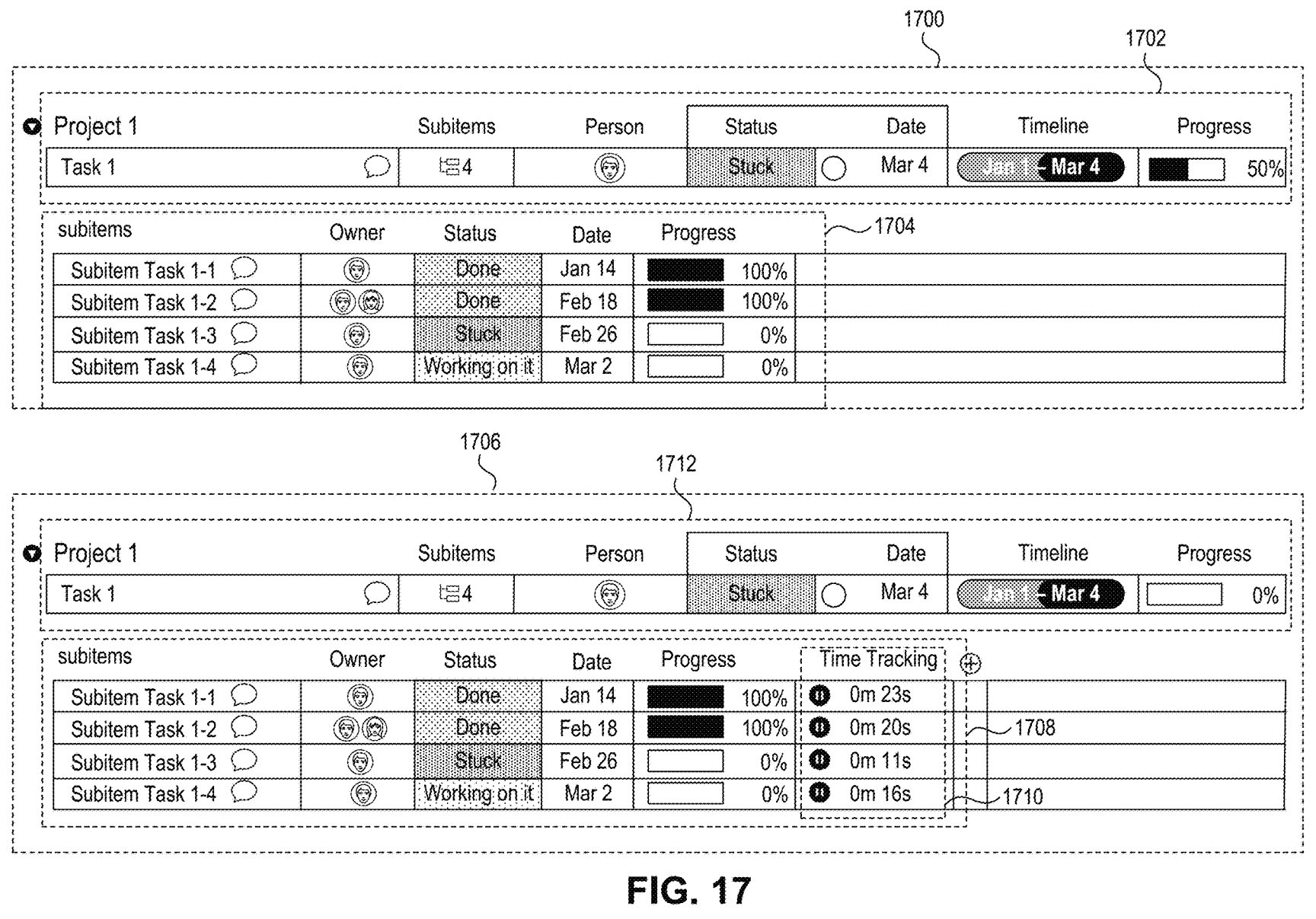

By way of example, FIG. 17 illustrates a first view 1700 displaying the first row 1702 of a main table. The first row 1702 may include any number of columns containing different information. The first sub-table 1704 may have five columns having the column heading definitions "subitems," "Owner," "Status," "Date," and "Progress". In addition, the first sub-table may have four rows. The second view 1706 may be rendered in response to a request to update data in the first sub-table 1704, resulting in the same but updated first sub-table 1708 with an additional column 1710 (e.g., the previously mentioned update) with column heading definition "Time Tracking." The change in the same first sub-table 1708 (the addition of "Time Tracking" column 1710) would not alter the structure or information in the main table, as shown by main table 1702 of the first view 1700, and the same main table 1712 of the second view 1706.

In some embodiments, the at least one processor may receive an activation of a link associated with a first row of the main table, and upon activation may access the first sub-table. Receiving an activation of a link may include receiving an input from any interface (e.g., a touchscreen, mouse, keyboard, camera, and so on) to indicate an intent to activate a link. Activation of a link may refer to a triggering of an electronic request to access or retrieve information located in another location, such as information associated with a first sub-table. Activation of a link may also include causing a display to render the retrieved information, such as information of a first sub-table. A link may refer to a hyperlink, an image, a widget, an object, a drop down menu, or a graphical user interface (GUI), or any combination thereof. For example, the main table may include four rows, each containing a link to a first sub-table contained in a cell as a digital button. In response to activating a link (e.g., a link contained in a first row of the main table) the system may be configured to access information in the first sub-table and render a display of the first sub-table and the information contained therein. A user may also access the cells of the first sub-table upon the expansion of the first row as a result of activating the link in the first row.

Figures 18A, 18B:
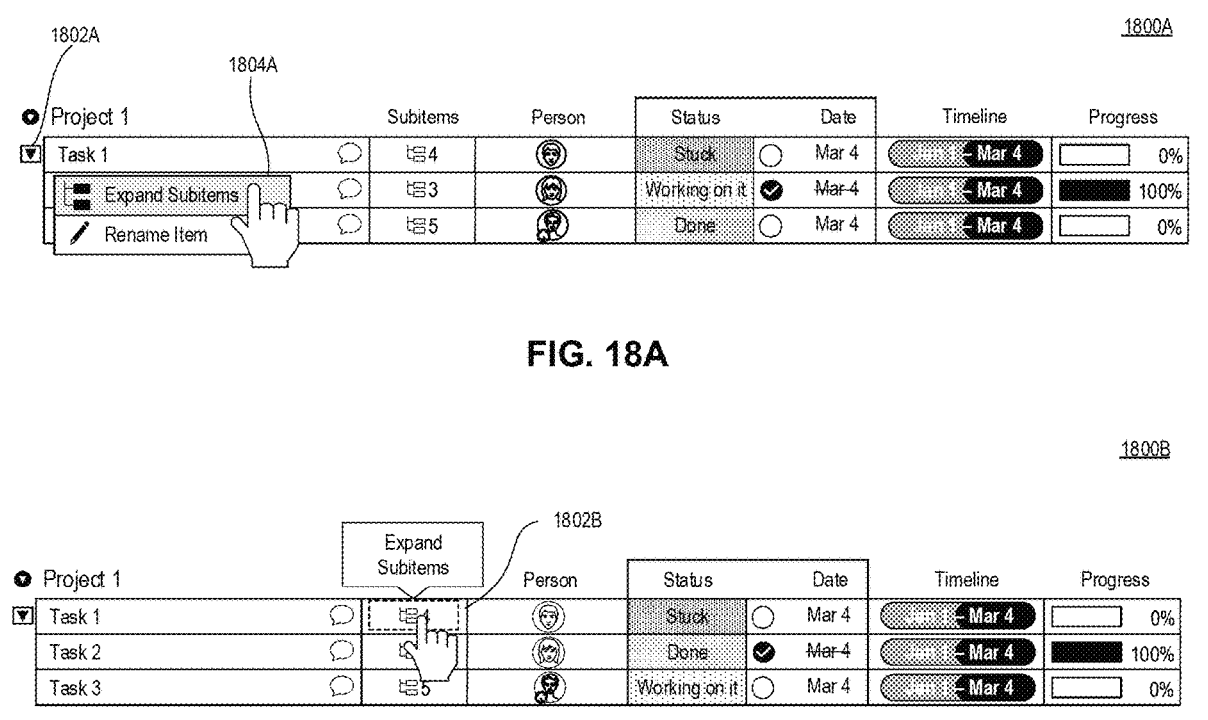

FIG. 18A illustrates example main table 1800A having a plurality of rows and columns where the rows of the main table may be collapsed to not show any sub-tables. The activation of a link may include a drop-down menu 1802A for the first row of the main table. The drop-down menu may provide a window 1804A listing "Expand Subitems" to expand the first row of the main table to also display the first sub-table, as shown in FIG. 16.

In another example, FIG. 18B illustrates main table 1800B having a plurality of rows and columns where the rows of the main table may be collapsed to not show any sub-tables. A link may be contained in a cell 1802B containing a combination of graphics and alphanumerics. The activation of the link may include clicking the subitems cell 1802B to expand the first row of the main table to display the first sub-table, as shown in FIG. 16.

In some embodiments, the at least one processor may be configured to display in a common view, information from a first sub-table and information from a main table. A common view may refer to the display of a single rendering to present data or information in the shared confines of the display. For example, a common view may include a presentation of a first sub-table under the first row of the main table while displaying data or information from the remaining rows of the main table all in the same display. For example, the first sub-table may be displayed overlaid or superimposed on a portion (or all) of the main table.

By way of example, FIG. 16 illustrates common view 1600 displaying both the first row 1602 of the main table, which has been expanded to include the first sub-table 1606. In addition, the common view 1600 may also simultaneously display the other rows 1604 of the main table.

In some embodiments, the common view may include summary information from the first sub-table in the main table. Summary information may refer to any visual display of high level, overview that is representative of a full set of information, such as, a graphical summarization, textual summarization, numerical summarization, or combination of any or all such summarized information. Furthermore, the summary information may be presented in a form of a number, range of numbers, percentage, chart, or any other form of data representation. A graphical summarization may include a bar chart, a pie chart, or any other chart or diagram divided proportionally based on corresponding percentages. For example, a column of a first sub-table may contain three statuses marked as "done" and two statuses marked as "in progress." A graphical representation displaying the summary information of the first sub-table may be a chart that may be split in two parts to indicate that 40% of work is "in progress" (two out of five statuses) and 60% of work is "done" (three out of five statuses). The graphical representation may be sized or shaped in any other manner, such as by volume, by a count, by size of individual icons representing individuals, or any other representation to reflect a count, a priority, or any other indication in a table. The summary information may be placed in any location in the main table or in the sub-table. This summary information may include information contained in both the first sub-table and the main table, and the summary information may be presented as part of the main table in the common view. In this way, even when the sub-table is obscured from view, a user may be able to understand high level information contained in the main table and any hidden sub-tables associated with the main table.

For example in FIG. 15, summary representation 1514 indicates summary information of statuses contained in the columns of the main table 1512 and sub-table 1508, such that when sub-table 1510 is minimized and no longer showing, the graphical summary representation 1514 would still summarize information contained in both the main table 1512 and sub-table 1510 in the common view 1506. While graphical summary representation 1514 in FIG. 15 is shown as a bar, any other representation of summary may be presented, such as text, animations, other graphics, or a combination thereof.

In some embodiments, the summary information from the first sub-table may be displayed in a cell of the main table. The summary information, as discussed above, may be located in a cell in a row of the main table or in a cell in any row of the main table.

By way of example, FIG. 16 illustrates a main table 1600 with a first row 1602 and a first sub-table 1606. The status column 1614 may be summarized as summary information in cell "Subitems Status" 1616. The cell "Subitems Status" 1616 may be a graphical representation showing differing proportions of the different status in status column 1614. Similarly, the progress column 1618 may be summarized as a summary information in cell "Subitems Progress" 1620 in the form of a graphical representation showing differing proportions of the status in progress column 1618. In some other embodiments not shown, the summary information may aggregate high level information from both the main table and the sub-table in a single summary representation in the main table.

Aspects of the disclosure may include rendering, in the main table, a display of an indication of a number of sub-items in the first sub-table. An indication of the number of sub-items may refer to a measure, a value, a text, an image, a level showing the quantity, number, percentage, fraction of the sub-items in a first sub-table, or a combination thereof. A subitems may refer to the number of rows in the first sub-table. For example, a cell in the first row or any row of the main table may render or display the total number of rows of the sub-table by way of a graphical image and a number.

For example, FIG. 16 illustrates subitem cell 1608 that may render or display an image adjacent to the number "4." The number "4" in subitems cell 1608 may represent the number of rows or sub-items in the first sub-table 1606. Further in FIG. 16, corresponding cells of the main table show "3" and "5" to indicate that the sub-tables associated with Task 2 and Task 3 contain three and 5 subitems in the sub-tables associated with each of those tasks. In this way, a user may quickly understand the relative volume of information contained in an associated sub-table of the main table.

Consistent with some disclosed embodiments, at least one processor of the system may carry out operations that may involve receiving a second electronic request for association of a second sub-table with a second row of the main table. The second electronic request may be another request similar to or different from the first electronic request discussed previously above. A second sub-table may be another similar sub-table or different sub-table from the first sub-table, as discussed above. A second row of the main table may be any row that may be different from the first row of the main table as described previously. For example, the second row of the main table may be displayed in a collapsed manner where there may not be any sub-table associated with it. The second electronic request may be executed by clicking on a cell in the second row of the main table, which may prompt the at least one processor to generate the second sub-table. Upon receiving the second electronic request for the second row of the main table, the at least one processor may generate a second sub-table, which may allow the user to reuse existing column heading definitions or generate new column heading definitions.

Figure 19:
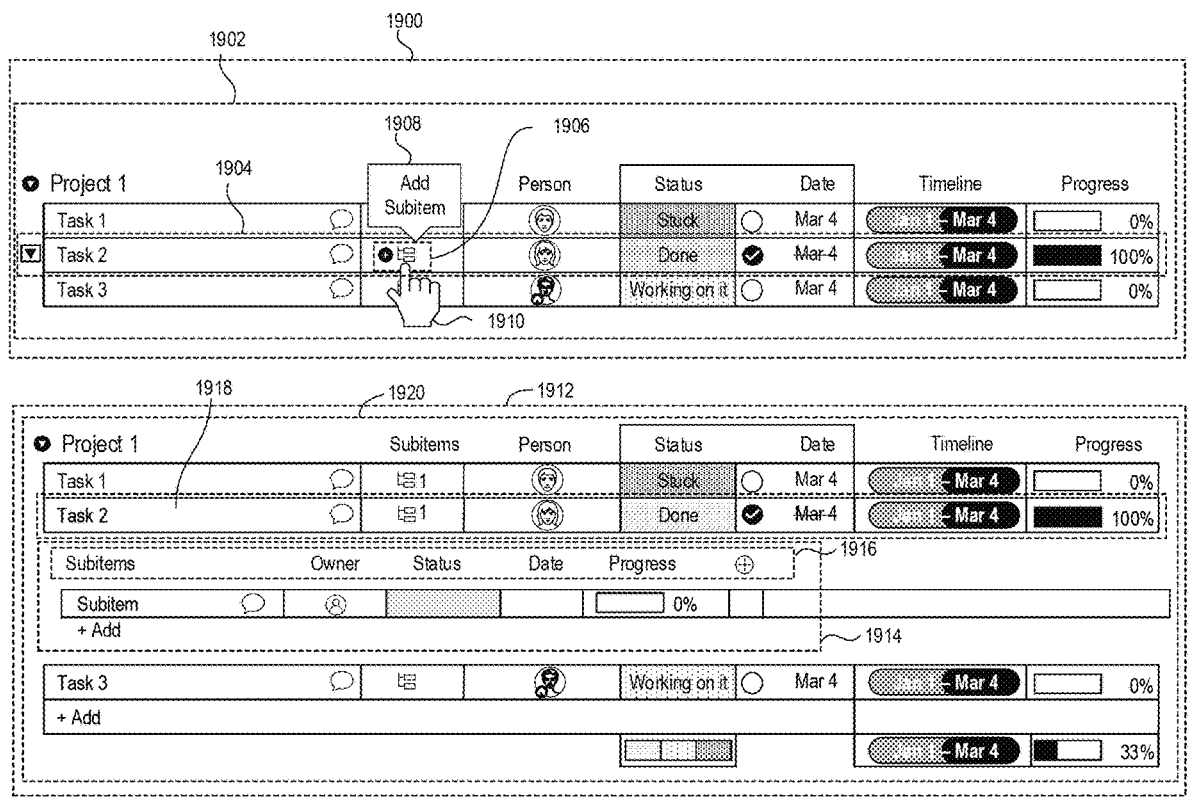
FIG. 19 illustrates example views of receiving a second electronic request to generate a second sub-table for a second row of the main table, consistent with some embodiments of the present disclosure.

FIG. 19 illustrates an exemplary first view 1900 that may display a main table 1902. The main table 1902 may have a second row 1904 containing a subitems cell 1906 that may prompt "Add Subitem" 1908 when a user clicks or hovers with cursor 1910 on a subitem cell 2006. Upon clicking 1910 in the first view 1900, the second view 1912 may display a second sub-table 1914 having column heading definitions 1916. The second sub-table 1914 may be displayed below the same second row 1918 of the same main table 1920.

Consistent with some disclosed embodiments, at least one processor of the system may carry out operations that may involve performing a lookup of a default sub-table structure following receipt of a second electronic request. Performing a lookup of the default sub-table structure may refer, to an action, process, instance of looking or searching for the default sub-table structure being prompted inside a list displaying a plurality of options for one or more similar or different table structure. For example, the at least one processor may automatically perform a lookup for a default sub-table structure in a remote repository for application to a newly generated sub-table, as indicated by the second electronic request, as discussed in further detail below. In addition, the lookup may be associated with the structure of one or more tables or sub-tables in boards not related to the main table.

In some embodiments, at least one processor of the system may carry out operations that may involve applying a default sub-table structure to a second sub-table. Applying a default sub-table structure to the second sub-table may include adopting the default sub-table structure (e.g., column headings, row headings, and the order in which they are presented) for a newly generated sub-table such that the newly generated sub-table has the same structure as the default sub-table structure. For example, the at least one processor may apply the default sub-table structure (previously established by the structure of the first sub-table) to the second sub-table based on the selected default sub-table during the look up. The second sub-table may have the same column definitions as the first sub-table. Furthermore, the second sub-table may have the same or different number of rows or sub-items as the first sub-table.

FIG. 20 illustrates a main table 2000 with an expanded second row 2002 where a drop-down list 2004 may provide a plurality of options for the structure for the second sub-table 2006. The user may select the list named "Default sub-table structure" 2008 to apply to the second sub-table 2006 now having the same structure and column heading definitions as the first sub-table 2010 under the expanded first row 2012. The second sub-table 2006 may or may not have the same number of rows or sub-items as the first sub-table 2010.

Consistent with some disclosed embodiments, at least one processor of the system may carry out operations that may involve receiving a change to a structure of a second sub-table, and upon receipt of the change, cause a corresponding change to occur in the first sub-table and the default sub-table structure. In some embodiments, receiving a change to a structure may include receiving an input through any interface, as discussed previously above, to indicate an intent to make an alteration to a structure. A change to a structure of the second sub-table may refer to modifying, adding, subtracting, rearranging, or any other altering of the structure of the second sub-table. For example, a default sub-table structure may consist of three column definitions such as "subitem tasks," "status," and "progress." The default sub-table structure may be assigned to a first sub-table structure and a second sub-table structure that may have the same columns as the default sub-table structure. Upon the addition, subtraction, or rearrangement of a column heading definition for the first sub-table structure or the second sub-table structure, the at least one processor may automatically update the default sub-table structure to add, subtract, or rearrange the same column heading definition. One or more sub-items in a first sub-table may be linked to one or more sub-items in the second sub-table, which may generate mirrored or duplicated sub-items between the first sub-table and the second sub-table. Linking one or more sub-items to one or more sub-tables may also across boards with different main tables.

FIG. 21 illustrates the main table 2100 with an expanded second row 2102. In response to a user selecting the list "Time Tracking" 2104, a column head definition "Time Tracking" 2106 may be added to the second sub-table 2108. In response, the at least one processor may automatically add the same column definition "Time Tracking" 2110 to the first sub-table 2112 under the first row 2114. The default sub-table structure may also be automatically updated to include the added "Time Tracking" column heading definition for any subsequent application of the default sub-table structure. The addition, subtraction, or rearrangement of rows or sub-items to the first sub-table may or may not automatically change the structure of the second sub-table and vice versa.

Figure 22:
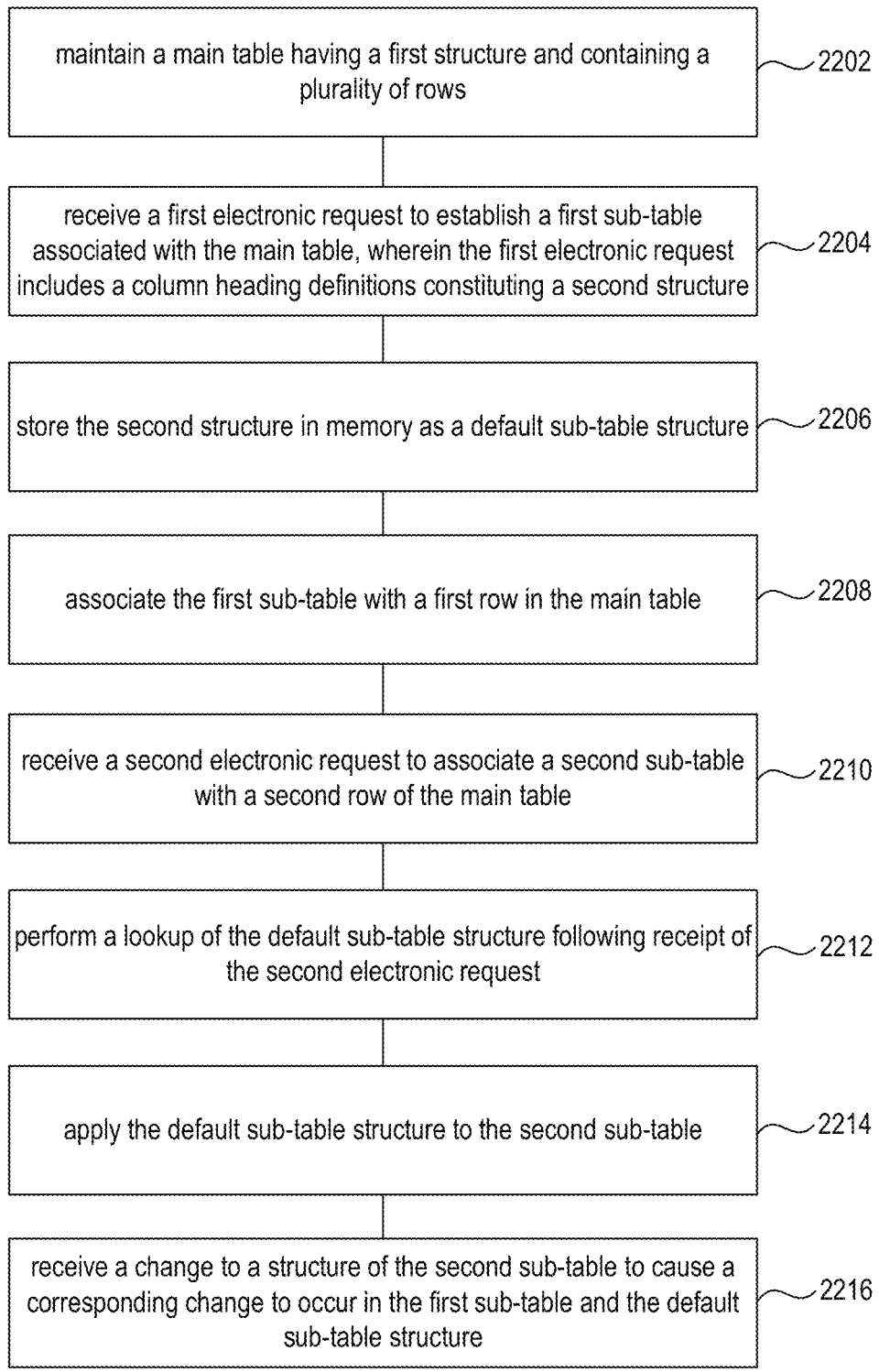
FIG. 22 is a block diagram for an exemplary method for representing data via a multi-structured table, consistent with some embodiments of the present disclosure.

FIG. 22 illustrates a block diagram for an exemplary method for representing data via a multi-structured table, consistent with some embodiments of the present disclosure. Method 28-10-00 may begin with block 2202 by maintaining a main table having a first structure and containing a plurality of rows, as previously discussed. At block 2204, method 2200 may include receiving a first electronic request for the establishment of a first sub-table that may be associated with the main table, wherein the first electronic request may include a column heading definitions, and the column heading definitions may constitute a second structure, as previously discussed. At block 2206, method 2200 may include storing the second structure in memory as a default sub-table structure, as previously discussed. At block 2208, method 2200 may include associating the first sub-table with a first row in the main table, as previously discussed. At block 2210, method 2200 may include receiving a second electronic request to associate a second sub-table with a second row of the main table, as previously discussed. At block 2212, method 2200 may include performing a lookup of the default sub-table structure following receipt of the second electronic request, consistent with the disclosure discussed above. At block 2214, method 2200 may include applying the default sub-table structure to the second sub-table, consistent with the disclosure above. At block 2216, method 2200 may include receiving a change to a structure of the second sub-table where upon the receipt of the change, the at least one processor may cause a corresponding change to occur in the first sub-table and the default sub-table structure, consistent with the disclosure above.

Aspects of this disclosure may provide a technical solution to challenges associated with collaborative work systems. Some disclosed embodiments include methods, systems, devices, and computer-readable media. For ease of discussion, a system is described below with the understanding that the disclosed details may equally apply to methods, devices, and computer-readable media. Some disclosed embodiments may be used for deconstructing an integrated web of structural components and data. This may occur using at least one processor configured to maintain the integrated web of the structural components and the data, wherein the structural components include customized tables for maintaining the data, automations for acting on the data in the customized tables, and dashboards for visualizing the data. Maintaining may include storing a web of structural components (as described below) and data in memory or storage. This may be accomplished, for example, using at least one processor configured for sending/receiving network packets, verifying connections, activating a graphical user interface (GUI), verifying updates, encrypting communications, and/or any other actions performed to make a table accessible from a data structure. An integrated web of the structural components (may also be referred to as template, workflow, solution, or an application throughout the disclosure) may refer to a group or a subset of interconnected, linked, dependent, or otherwise associated structural components (e.g., a table with a column structure). The structural components may be used to organize/hold maintained data. The structural components may refer to customized rows, columns, tables, dashboards, or any combination thereof for maintaining the data. In some instances, the structural components may be associated with automations for acting on the data in the customized tables. Customized tables for maintaining the data may refer to tables designed for a specific purpose or otherwise constructed or modified to be presented in an organized manner according to a preference. Automations for acting on the data in the customized tables may refer to set of logic rules, scripts, conditional actions or other modifiers that may be applied to data or table structures. Dashboards for visualizing the data may refer to high level arrangements of data, specialized views, panels, or any other organized presentation of data that may enable a user to obtain a summary view of view of data contained in a data set. A deconstruction of an integrated web of structural components and data may include a separation of data contained in a structural component from the structural component itself, such that the structural component only includes structural definition for components such as rows, columns, tables, dashboards, solutions, or any combination thereof as described above. Thus, deconstruction may include the removal of data from one or more columns, rows, or the entirety of a table.

Some embodiments may also involve receiving instructions to alter elements of at least some of the structural components and updating the integrated web to comport with the instructions. Receiving instructions may occur by receiving an input from any user interface (e.g., a mouse, keyboard, touchscreen, camera) or from an automatic action triggered in the system to indicate an intent to instruct the processor to perform an action. For example, the system may send/receive network packets, respond to commands from a graphical user interface (GUI), respond to automation tasks automatically, or otherwise responding to any other actions performed that may be interpreted as instructions. Altering elements of the structural components may refer to adding, removing, rearranging, transmitting, or otherwise modifying elements of structural components as disclosed earlier. By the way of a non-limiting examples, a table may be modified in various ways such as adding a row or column, modifying an automation associated with a table by adding or removing an additional step of the automation, modifying a dashboard to present data in different manner such as changing diagram type from pie chart to bar graph, or any other alterations that may be associated with the table. Updating the integrated web to comport with the instructions may refer to modifying, adding, removing, rearranging, or otherwise changing the version of an integrated web of structural components in a manner that complies with a request or command to do so.

Additionally, aspects of the disclosure may involve receiving a command to generate a copy of the structural components of the integrated web without the data. Receiving a command may include receiving instructions from any user interface or from the system, as described previously above. A copy of the structural components may refer to an identical or nearly identical structure configured to contain data. The copy may be stripped of the associated data (e.g., information contained in cells, such as cells at intersections of rows and columns). Additionally, in response to the command, some embodiments may involve outputting the copy of the structural components in a template format that permits the copy to be adopted for secondary use. Outputting the copy of the structural components may include generating a duplicate of the copied structural components and in some instances, presenting the copy of the structural components in a display or any other user interface consistent with the disclosure above. A template format may refer to a model, prototype, table, template, or other structural reusable format that permits the copy to be adopted for secondary use. A secondary use may refer to a use after the template format has been generated, such as a use by another entity, a use by the author of the original structural components of the integrated web with a different set of data, or any other use other than the original use in the original structural components of the integrated web as previously described.

Figure 23:
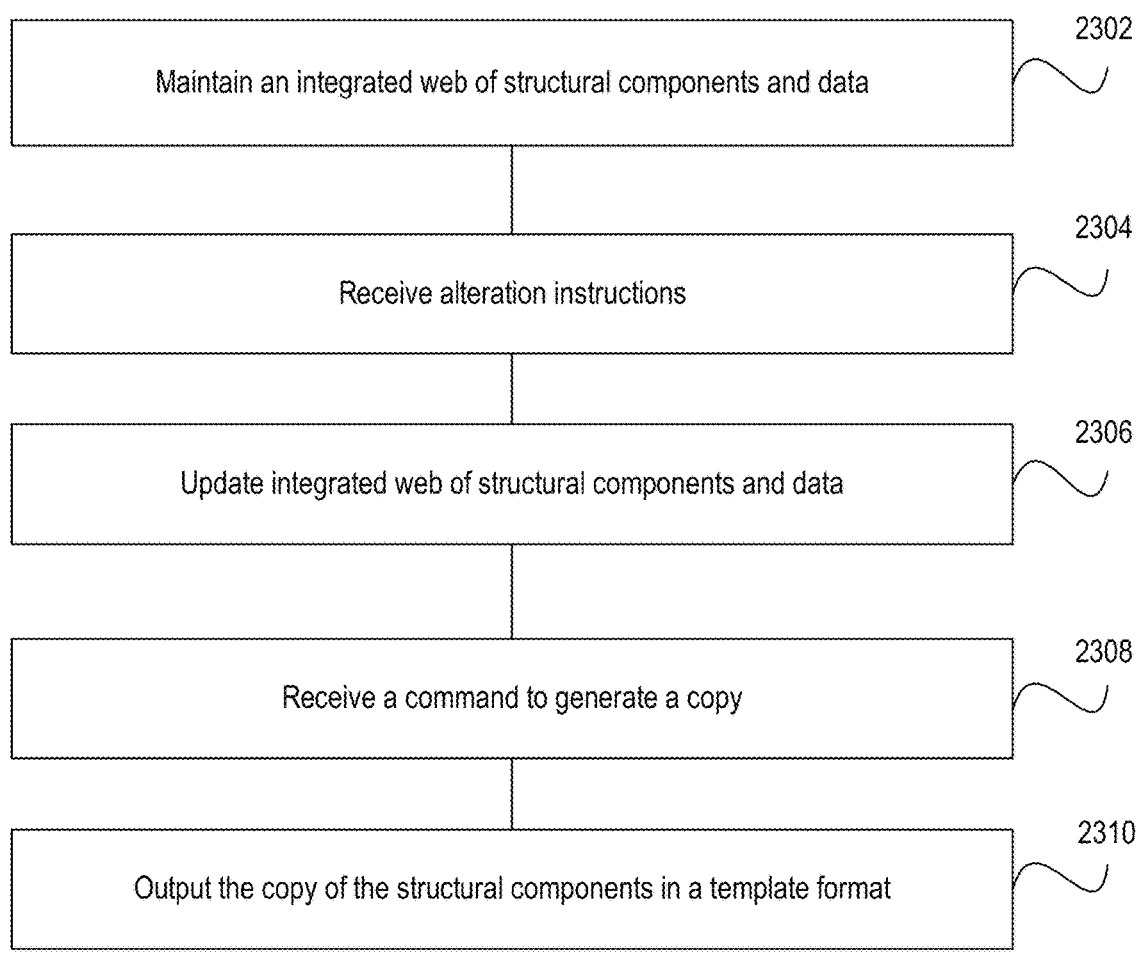
FIG. 23 is a block diagram of an exemplary method for deconstructing an integrated web of structural components and data, consistent with some embodiments of the present disclosure.

FIG. 23 illustrates a block diagram of an exemplary method 2300 for deconstructing an integrated web of structural components and data. This may occur, for example, in a collaborative work system. Method 2300 may be performed by the computing device 100 in conjunction with computing architecture 200 as depicted and described above with references to FIG. 1 and FIG. 2. Method 2300 may begin at block 2302 by maintaining an integrated web of the structural components and the data, wherein the structural components include customized tables for maintaining the data, automations for acting on the data in the customized tables, and dashboards for visualizing the data. Method 2300 may proceed to block 2304 by receiving instructions to alter elements of at least some of the structural components consistent with the disclosure above. Once instructions are received method 2300 may proceed to block 2306 by updating the integrated web to comport with the instructions as disclosed earlier. Method 2300 may further proceed to block 2308 by generating a copy of the structural components of the integrated web without the data as disclosed above. Method 2300 may then proceed to block 2310 where in response to the command it may output the copy of the structural components in a template format that permits the copy to be adopted for secondary use, consistent with earlier disclosure.

Some disclosed embodiments may involve exporting a copy in the template format to a repository for access by third parties. Exporting the copy in the template format may refer to copying, transferring, relocating, transmitting, or otherwise moving the copy in the template format to a repository location, such as a remote memory or remote server. A repository may refer to a store front, marketplace, shared data store, cloud storage, or any other means of storage accessible by first and/or third parties. Third parties may include any individual or other entity other than the first party, a first party being the originator, owner, or first user of the structure. Additionally, aspects of this disclosure may involve enabling revision of the copy prior to export. A revision may refer to a modification, addition, removal, or rearrangement of any data or structure within the copy consistent with the earlier disclosure. By the way of a non-limiting example, a revision may include a change in a column heading, a row heading, and/or a column linkage. Alternative non-limiting examples or revisions may include a change in table structure, change in an automation applied to the table, or change in the presentation of dashboards associated with the table or the mapping of specific data from the table. Automations may include logical sentence structures defining logical rules, wherein the instructions to alter elements may include an instruction to alter at least one portion of a logical sentence structure. A logical sentence structure, as discussed herein, may refer to a logical rule with one or more logical connectors, and configured to act on table data to produce an outcome. Logical rules may refer to underlying logic created by the automation. Underlying logic may be in a form of a script, assembly language, block diagram or any other form understandable by the processor or system. A non-limiting example of an alteration of a logical sentence structure may include modifying a conditional action from "send notification to Albert" to "initiate phone call with Albert."

Aspects of the present disclosure may also involve limiting access to the copy to entities with access authorization. Limiting access may refer to a permission-based availability within a repository that may not be generally accessible to the public. By the way of a non-limiting example, access authorization may be dependent on a receipt of a recompense signal. A recompense signal may refer to an authorization signal, payment signal, authentication signal, or any other means of permitting access to the copy. This may be useful to restrict access within specific organizations or alternatively may enable a developer to charge payment in exchange for access via the recompense signal.

Figure 24:
FIG. 24 is an exemplary representation of a template center, consistent with some embodiments of the present disclosure.

FIG. 24 illustrates an exemplary representation of template center. Template center view 2400 may allow a user to access a repository of an integrated web of structural components and/or shared templates for various use cases. Template center view 2400 allows a user to navigate a large number of templates via a navigation section 2402. Additionally, users may preview existing templates in a preview section 2404 or create their own template from scratch as depicted by block 2406.

Figure 25:
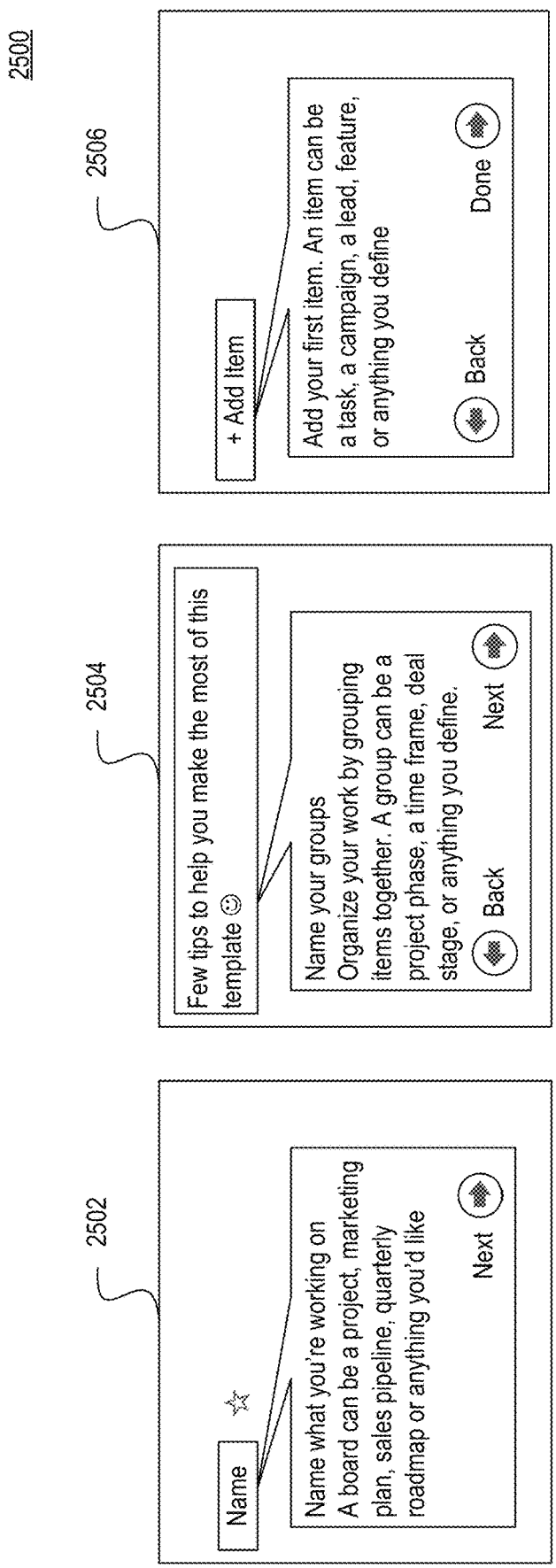
FIG. 25 is an exemplary representation of a template creation tutorial, consistent with some embodiments of the present disclosure.

FIG. 25 illustrates an exemplary representation of a template creation tutorial in a tutorial view 2500. In the event a user chooses to generate a template from scratch, the template generation may be guided though the template tutorial view 2500. A user may be shown to carry out various actions such as naming a template, and may be shown the available tools in the system and their uses. For example, block 2502 represents a tutorial for naming of a board accompanied by an explanation of what can be built to be a part of a template. Similarly, tutorial blocks 2504 and 2506 illustrate exemplary tutorials for group and item generation, respectively.

Figure 26:
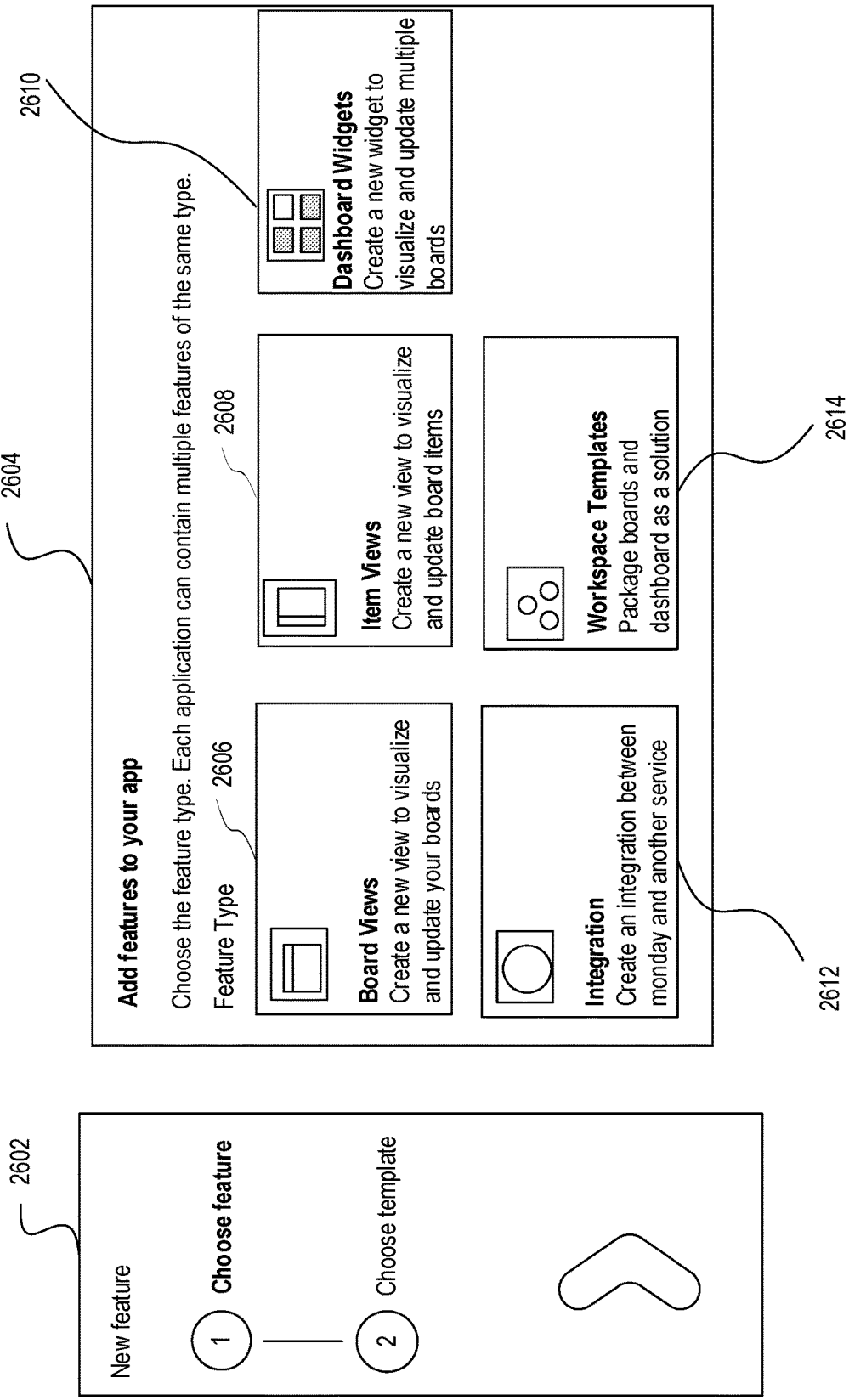
FIG. 26 is an exemplary representation of a feature center, consistent with some embodiments of the present disclosure.

FIG. 26 illustrates an exemplary representation of a feature center. Feature selection view 2600 allows for a guided approach for selecting an appropriate feature that may be applied to a template as shown in section 2602 of the feature selection view 2600. Exemplary features include but are not limited to generating board views 2606, item views 2608, dashboard widgets 2610, integrations 2612, and workspace templates 2614. Board view icon 2606 may enable users to generate a new view to visualize and update existing boards. Item view icon 2608 may enable users to generate a new view to visualize and update board items. Dashboard widgets icon 2610 may enable users to generate a new widget to visualize and update multiple boards. Integration icon 2612 may enable users to generate integration between various third-party services, such as ticketing service or an email service. Workspace templates icon 2614 may enable users to package boards and dashboards as a unified solution.

Users may be enabled to modify generated templates by versioning changes. Versioning may enable users to add or change functionality easily without disrupting existing end-users. Versioning enables users to maintain multiple draft versions and push specific versions to an end-user base as specific versions are finalized for release. Minor versions (e.g., versions including minor revisions) may be automatically pushed to end-users while major versions (e.g., versions including major revisions) may require end-users to reinstall the application. Major versions may be for large changes that could potentially break or otherwise disrupt a user's workflow. Existing users may need to reinstall the application when a new major version is released. Minor versions may be for small changes that can be pushed to end-users immediately. When a minor version is promoted, it may automatically be added to existing end-users' accounts.

Figure 27:
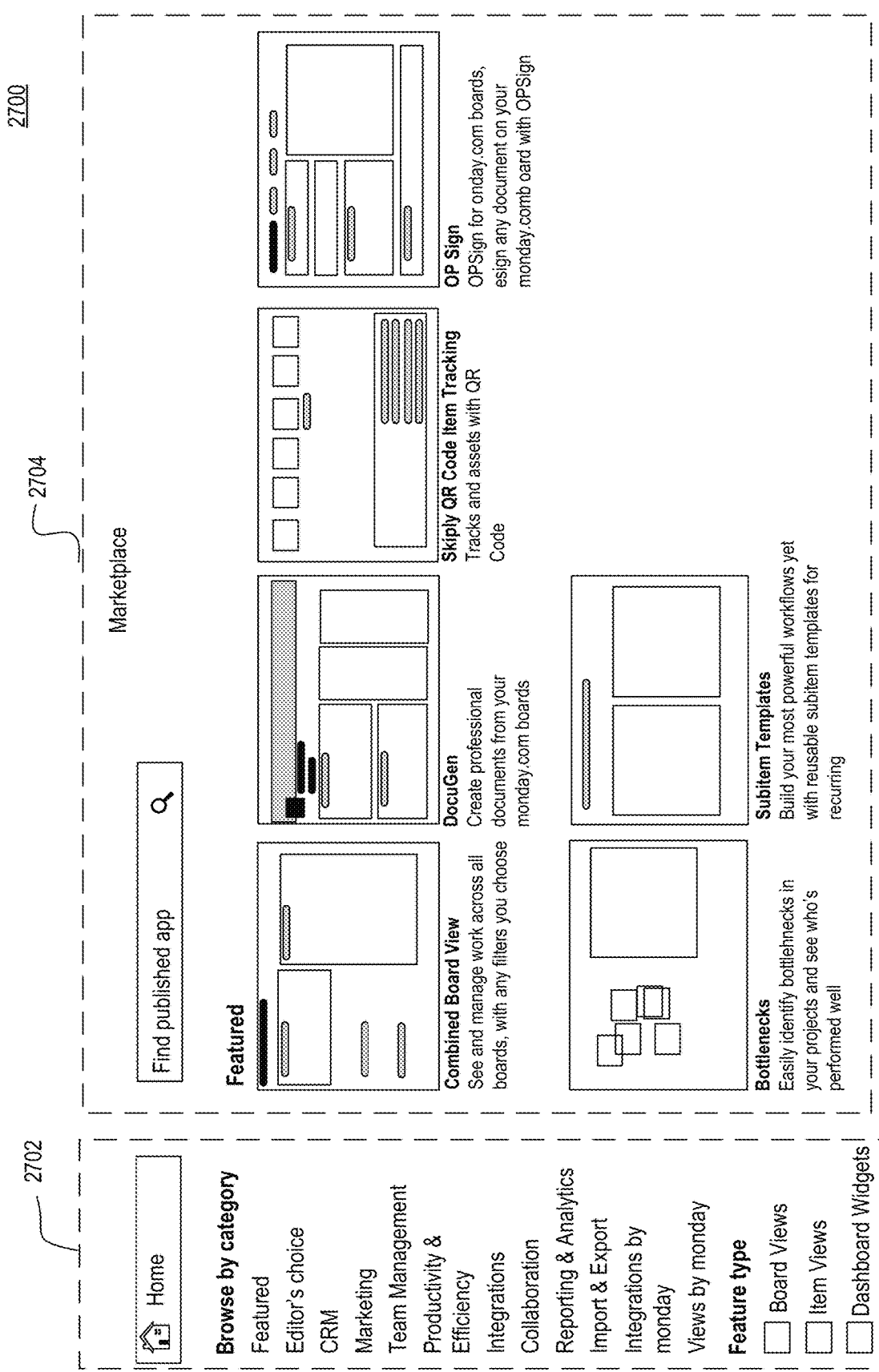
FIG. 27 is an exemplary representation of a marketplace view, consistent with some embodiments of the present disclosure.

FIG. 27 illustrates an exemplary representation of a marketplace view 2700. Marketplace view 2700 includes a navigation panel 2702, and a preview panel 2704. Navigation panel 2702 allows users to search and filter available applications within a marketplace. Filtering may be performed by selecting specific features consistent with the earlier disclosure. Applications may be shared for free, for purchase, or any combination of the approaches such as through a test trial or freemium model. There may be two primary ways that users can share an application. First, an application may be shared privately where these applications may be developed and shared only with other specific end-users. This approach may be preferred if a user builds a private application for a specific client, or for some internal teams. Second, an application may be shared publicly that may be available for anyone to use. Applications may be submitted to a marketplace by an author or any other use. If an application is approved, it may be available in a marketplace for all platform users to access and install in their accounts. Preview panel 2704 may show brief descriptions as well thumbnail previews of the approved, shared applications. Additionally, a referral link with a preinstalled application may be generated. If a new user creates an account using the referral link, an application may be preinstalled for the user and user may be able to interact with it without any additional steps.

Some embodiments will be apparent to those skilled in the art from consideration of the specification and practice of some of the disclosed embodiments disclosed herein. It is intended that the specification and examples be considered as exemplary only, with a true scope and spirit of some of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while some illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

The terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

displaying a table having at least one customizable row heading or column heading;

receiving an insertion of a customized name for the at least one customizable row heading or column heading;

performing a lookup of the inserted customized name to identify a data type associated with the inserted customized name;

displaying, based on the identified data type, selectable options for values for an associated cell of the at least one customizable row heading or column heading;

enabling selection of at least one option of the selectable options;

associating the selected option with the associated cell in at least one row or column associated with the at least one customizable row heading or column heading;

wherein the at least one processor is further configured to receive the insertion of the customized name from a list of predefined customized names;

receiving the insertion of the customized name using alphanumeric keystrokes;

wherein displaying the selectable options includes displaying a drop down menu of options;

wherein displaying the selectable options includes values that are displayed in at least one button;

wherein the at least one processor is further configured to receive an insertion of a second customized name for a second customizable row heading or column heading;

wherein the at least one processor is further configured to perform a second lookup of the second customized name in combination with the previously inserted customized name to identify a second data type associated with the second customized name;

wherein the at least one processor is further configured to display selectable options for second values for a second associated cell of the second customizable row heading or column heading;

wherein the at least one processor is further configured to enable selection of one of the second values;

wherein the at least one processor is further configured to populate the second associated cell with the second value upon selection of the second value;

storing a customized hybrid table-template definition, wherein the hybrid table-template definition includes a table format and at least one pre-population rule linking at least one cell of the hybrid table template with at least one cell of a preexisting table populated with data;

receiving a request to generate a new table using the hybrid table template definition;

following receipt of the request, generate the new table;

wherein generating includes following a link to access real-time cell data from the preexisting table, and migrating the real-time cell data to the new table;

wherein the real-time cell data is variable and wherein the at least one processor is configured such that when the real-time data is updated in the preexisting table, an update automatically occurs via the link to the new table;

wherein the at least one pre-population rule linking at least one cell of the hybrid table template with at least one cell of a preexisting table includes a plurality of pre-population rules linking a plurality of cells from a plurality of preexisting tables with the hybrid table template;

wherein the hybrid table template includes a plurality of cells, a first portion of which are linked to a preexisting table via a corresponding pre-population rule and a second portion of which are unlinked to a preexisting table;

wherein the pre-population rule is configured for dependency on other data in the new table, and wherein pre-population occurs after other data is entered in the new table;

wherein the at least one pre-population rule draws from at least one preexisting table at least one of a capacity, a count, an identity, a budget, variable numerical data, a timeline value, a status value, and a progress value;

wherein the at least one processor is further configured to receive a request to alter the stored hybrid table template definition based on data in the new table;

wherein the request to alter the stored hybrid table template definition is based on a sub-selection of data in the new table;

maintaining a main table having a first structure and containing a plurality of rows;

receiving a first electronic request for establishment of a first sub-table associated with the main table;

wherein the electronic request includes column heading definitions and wherein the column heading definitions constitute a second structure;

storing the second structure in memory as a default sub-table structure;

associating the first sub-table with a first row in the main table;

receiving a second electronic request for association of a second sub-table with a second row of the main table;

performing a lookup of the default sub-table structure following receipt of the second electronic request;

applying the default sub-table structure to the second sub-table;

receiving a change to a structure of the second sub-table, and upon receipt of the change, cause a corresponding change to occur in the first sub-table and the default sub-table structure;

wherein the at least one processor is further configured to receive a request to update data in the first sub-table, and wherein the update does not alter data in the main table;

wherein the at least one processor is further configured to display in a common view, information from the first sub-table and information from the main table;

wherein the at least one processor is further configured to receive an activation of a link associated with the first row of the main table, and upon activation to access the first sub-table;

wherein the common view includes summary information from the first sub-table in the main table;

wherein the summary information from the first sub-table is displayed in a cell of the main table;

wherein the at least one processor is further configured to render, in the main table, a display of an indication of a number of sub-items in the first sub-table;

maintaining the integrated web of the structural components and the data;

wherein the structural components include customized tables for maintaining the data, automations for acting on the data in the customized tables, and dashboards for visualizing the data;

receiving instructions to alter elements of at least some of the structural components;

updating the integrated web to comport with the instructions;

receiving a command to generate a copy of the structural components of the integrated web without the data;

in response to the command, outputting the copy of the structural components in a template format that permits the copy to be adopted for secondary use;

wherein the at least one processor is further configured to export the copy in the template format to a repository for access by third parties;

wherein the at least one processor is configured to enable revision of the copy prior to export;

wherein the revision includes a change in at least one column heading;

wherein the at least one processor is configured to limit access to the copy to entities with access authorization;

wherein the access authorization is dependent of receipt of a recompense signal; and wherein the automations include logical sentence structures defining logical rules, and wherein the instructions to alter elements include an instruction to alter at least one of the logical sentence structures.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for representing data via a multi-structured table, the system comprising:
at least one processor configured to:
maintain a main table having a first structure and containing a plurality of rows;
receive a first electronic request for establishment of a first sub-table associated with the main table, wherein the electronic request includes column heading definitions and wherein the column heading definitions constitute a second structure;
store the second structure in memory as a default sub-table structure;
associate the first sub-table with a first row in the main table;
receive a second electronic request for association of a second sub-table with a second row of the main table;
perform a lookup of the default sub-table structure following receipt of the second electronic request;
apply the default sub-table structure to the second sub-table;
receive a change to a structure of the second sub-table;

in response to the received change in structure of the second sub-table, alter the arrangement of data in the second sub-table; and upon receipt of the change in structure of the second sub-table, alter the default structure and cause a corresponding structural change in the first sub-table.

2. The system of claim 1, wherein the at least one processor is further configured to receive a request to update data in the first sub-table, and wherein the update does not alter data in the main table.

3. The system of claim 1, wherein the at least one processor is further configured to display in a common view, information from the first sub-table and information from the main table.

4. The system of claim 3, wherein the common view includes summary information from the first sub-table in the main table.

5. The system of claim 4, wherein the summary information from the first sub-table is displayed in a cell of the main table.

6. The system of claim 1, wherein the at least one processor is further configured to receive an activation of a link associated with the first row of the main table, and upon activation to access the first sub-table.

7. The system of claim 1, wherein the at least one processor is further configured to render, in the main table, a display of an indication of a number of sub-items in the first sub-table.

8. A non-transitory computer readable medium containing instructions that when executed by at least one processor, cause the at least one processor to perform operations for representing data via a multi-structured table, the operations comprising:

maintaining a main table having a first structure and containing a plurality of rows;

receiving a first electronic request for establishment of a first sub-table associated with the main table, wherein the first electronic request includes column heading definitions and wherein the column heading definitions constitute a second structure;

storing the second structure in memory as a default sub-table structure;

associating the first sub-table with a first row in the main table;

receiving a second electronic request for association of a second sub-table with a second row of the main table;

performing a lookup of the default sub-table structure following receipt of the second electronic request;

applying the default sub-table structure to the second sub-table;

receiving a change to a structure of the second sub-table;

in response to the received change in structure of the second sub-table, alter the arrangement of data in the second sub-table; and upon receipt of the change in structure of the second sub-table, alter the default structure and cause a corresponding structural change in the first sub-table.

9. The non-transitory computer readable medium of claim 8, wherein the operations further comprise receiving a request to update data in the first sub-table, and wherein the update does not alter data in the main table.

10. The non-transitory computer readable medium of claim 8, wherein the operations further comprise displaying in a common view, information from the first sub-table and information from the main table.

11. The non-transitory computer readable medium of claim 10, wherein the common view includes summary information from the first sub-table in the main table.

12. The non-transitory computer readable medium of claim 11, wherein the summary information from the first sub-table is displayed in a cell of the main table.

13. The non-transitory computer readable medium of claim 8, wherein the operations further comprise receiving an activation of a link associated with the first row of the main table, and upon activation to access the first sub-table.

14. The non-transitory computer readable medium of claim 8, wherein the operations further comprise rendering, in the main table, a display of an indication of a number of sub-items in the first sub-table.

15. A method for representing data via a multi-structured table, the method comprising:

maintaining a main table having a first structure and containing a plurality of rows;

receiving a first electronic request for establishment of a first sub-table associated with the main table, wherein the first electronic request includes column heading definitions and wherein the column heading definitions constitute a second structure;

storing the second structure in memory as a default sub-table structure;

associating the first sub-table with a first row in the main table;

receiving a second electronic request for association of a second sub-table with a second row of the main table;

performing a lookup of the default sub-table structure following receipt of the second electronic request;

applying the defau lt sub-table structure to the second sub-table; receiving a change to a structure of the second sub-table;

in response to the received change in structure of the second sub-table, alter the arrangement of data in the second sub-table; and upon receipt of the change in structure of the second sub-table, alter the default structure and cause a corresponding structural change in the first sub-table.

16. The method of claim 15, further comprising receiving a request to update data in the first sub-table, and wherein the update does not alter data in the main table.

17. The method of claim 15, further comprising displaying in a common view, information from the first sub-table and information from the main table.

18. The method of claim 17, wherein the common view includes summary information from the first sub-table in a cell of the main table.

19. The method of claim 15, further comprising receiving an activation of a link associated with the first row of the main table, and upon activation to access the first sub-table.

20. The method of claim 15, further comprising rendering, in the main table, a display of an indication of a number of sub-items in the first sub-table.

* * * * *